United States Patent
Park

(10) Patent No.: US 10,019,063 B2
(45) Date of Patent: Jul. 10, 2018

(54) HAPTIC FORCE-FEEDBACK FOR COMPUTING INTERFACES

(71) Applicant: New York University, New York, NY (US)

(72) Inventor: Tae Hong Park, New York, NY (US)

(73) Assignee: NEW YORK UNIVERSITY, New York, NY (US)

( * ) Notice: Subject to any disclaimer, the term of this patent is extended or adjusted under 35 U.S.C. 154(b) by 0 days.

(21) Appl. No.: 14/949,766

(22) Filed: Nov. 23, 2015

(65) Prior Publication Data

US 2016/0077591 A1   Mar. 17, 2016

Related U.S. Application Data

(63) Continuation-in-part of application No. PCT/US2014/039398, filed on May 23, 2014.
(Continued)

(51) Int. Cl.
*G06F 3/041* (2006.01)
*G06F 3/01* (2006.01)
(Continued)

(52) U.S. Cl.
CPC .......... *G06F 3/016* (2013.01); *G06F 1/1626* (2013.01); *G06F 1/1643* (2013.01); *G06F 1/1684* (2013.01); *G06F 1/1694* (2013.01); *G06F 3/0412* (2013.01); *G06F 3/0414* (2013.01); *G06F 3/0418* (2013.01); *G06F 3/0488* (2013.01); *G06F 3/04883* (2013.01); *G06F 3/14* (2013.01); *G06F 1/1656* (2013.01); *G06F 2200/1637* (2013.01); *G06F 2203/04104* (2013.01); *G06F 2203/04105* (2013.01)

(58) Field of Classification Search
CPC .... G06F 1/1656; G06F 1/1637; G06F 1/1626; G06F 1/1684; G06F 1/1643; G06F 1/26; G06F 1/16; G06F 3/041; G06F 3/0414; G06F 3/14; G06F 3/16; G06F 3/016; G06F 3/0416; G06F 3/0412; G06F 3/0488; G06F 2203/04105
See application file for complete search history.

(56) References Cited

U.S. PATENT DOCUMENTS 5,336,442 A * 8/1994 Kuramochi .............. C08K 3/04
                                                                    252/510
8,059,104 B2 * 11/2011 Shahoian .............. G06F 1/1616
                                                                    178/18.03
(Continued)

OTHER PUBLICATIONS

International Search Report and Written Opinion for PCT/US2014/039398, dated Jan. 9, 2015, 12 pages.

*Primary Examiner* — Dismery Mercedes
(74) *Attorney, Agent, or Firm* — Foley & Lardner LLP

(57) ABSTRACT

Methods, systems, and apparatuses, including computer programs encoded on computer-readable media, for receiving, from an accelerometer, angle information of a device. A calibration position is measured based upon the angle information of the device when the device is at rest. A current position is constantly measured based upon the angle information of the device. A current pressure is calculated based upon the current position and the calibration position. The current pressure can be used to augment an audio signal and/or used to augment an audio instruction.

19 Claims, 31 Drawing Sheets

Related U.S. Application Data

(60) Provisional application No. 61/827,390, filed on May 24, 2013.

(51) Int. Cl.
  *G06F 1/16* (2006.01)
  *G06F 3/14* (2006.01)
  *G06F 3/0488* (2013.01)

(56) References Cited

U.S. PATENT DOCUMENTS

| | | | | |
|---|---|---|---|---|
| 8,144,453 B2* | 3/2012 | Brown | | G06F 3/0414 |
| | | | | 345/173 |
| 8,169,332 B2* | 5/2012 | Son | | G06F 3/0418 |
| | | | | 178/18.01 |
| 8,310,458 B2* | 11/2012 | Faubert | | G06F 3/016 |
| | | | | 178/18.01 |
| 8,575,374 B1* | 11/2013 | DeLong | | C07D 233/60 |
| | | | | 549/548 |
| 8,757,374 B1* | 6/2014 | Kaiser | | F16M 11/10 |
| | | | | 206/320 |
| 9,146,620 B2* | 9/2015 | Whitt, III | | G06F 1/1618 |
| 9,349,552 B2* | 5/2016 | Huska | | G06F 3/016 |
| 2006/0007184 A1* | 1/2006 | Rosenberg | | A63F 13/06 |
| | | | | 345/173 |
| 2009/0027338 A1* | 1/2009 | Weinberg | | G06F 3/017 |
| | | | | 345/158 |
| 2009/0167702 A1* | 7/2009 | Nurmi | | G06F 3/0346 |
| | | | | 345/173 |
| 2010/0013761 A1 | 1/2010 | Birnbaum et al. | | |
| 2010/0103640 A1* | 4/2010 | Brown | | G06F 3/0414 |
| | | | | 361/829 |
| 2010/0174421 A1 | 7/2010 | Tsai et al. | | |
| 2011/0141052 A1* | 6/2011 | Bernstein | | G06F 3/016 |
| | | | | 345/174 |
| 2011/0157087 A1* | 6/2011 | Kanehira | | G06F 3/0414 |
| | | | | 345/174 |
| 2011/0261021 A1* | 10/2011 | Modarres | | G06F 3/016 |
| | | | | 345/177 |
| 2011/0304559 A1* | 12/2011 | Pasquero | | G06F 3/0412 |
| | | | | 345/173 |
| 2012/0068938 A1 | 3/2012 | Kontio | | |
| 2012/0127088 A1* | 5/2012 | Pance | | G06F 3/016 |
| | | | | 345/173 |
| 2012/0194448 A1* | 8/2012 | Rothkopf | | A45C 13/002 |
| | | | | 345/173 |
| 2013/0009907 A1* | 1/2013 | Rosenberg | | G06F 3/046 |
| | | | | 345/174 |
| 2013/0098782 A1* | 4/2013 | Diebel | | A45C 11/00 |
| | | | | 206/45.25 |
| 2013/0113715 A1* | 5/2013 | Grant | | G06F 3/0488 |
| | | | | 345/173 |
| 2013/0120258 A1* | 5/2013 | Maus | | G06F 3/044 |
| | | | | 345/161 |
| 2013/0277529 A1* | 10/2013 | Bolliger | | F16M 11/10 |
| | | | | 248/676 |
| 2014/0085247 A1* | 3/2014 | Leung | | G06F 3/0414 |
| | | | | 345/174 |
| 2014/0306938 A1* | 10/2014 | Block | | G06F 3/017 |
| | | | | 345/178 |
| 2014/0354570 A1* | 12/2014 | Makinen | | G06F 3/041 |
| | | | | 345/173 |
| 2015/0175309 A1* | 6/2015 | McGowan | | B65D 25/2882 |
| | | | | 224/191 |
| 2016/0187988 A1* | 6/2016 | Levesque | | F16M 11/18 |
| | | | | 345/156 |
| 2017/0068373 A1* | 3/2017 | Wright | | G06F 3/0414 |

\* cited by examiner

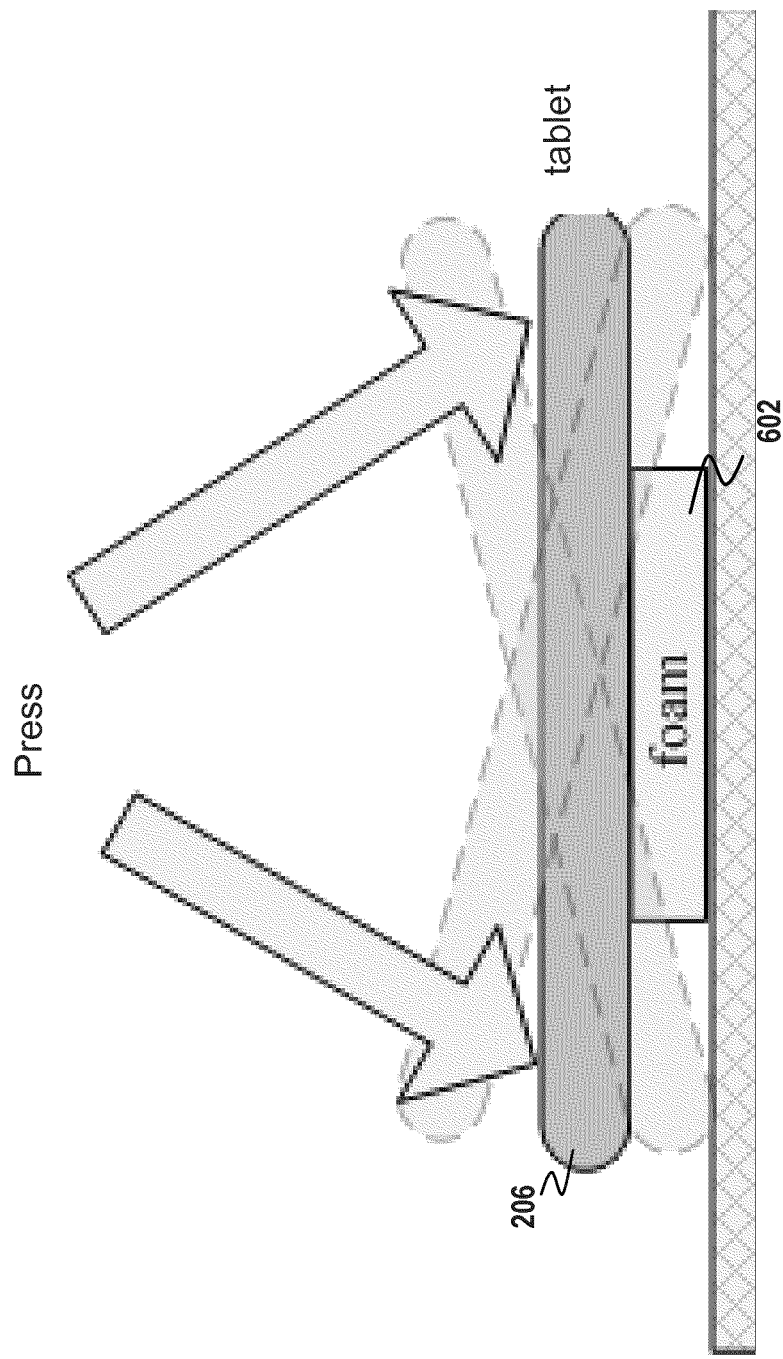

Figre 21A

HAPTIC FORCE-FEEDBACK FOR COMPUTING INTERFACES

CROSS-REFERENCE TO RELATED APPLICATIONS

This application is a Continuation-In-Part of US Application PCT/US2014/039398, filed May 23, 2014, incorporated herein by reference in its entirety, which claims priority from Provisional Application US Application 61/827,390, filed May 24, 2013, incorporated herein by reference in its entirety.

BACKGROUND

Mobile computing devices (MCD) have made an enormous impact in the public consumer space with explosive popularity for all types of users ranging from technology experts to computer illiterate users. Examples of MCDs include tablets, smart phones, phablets, portable music players, personal digital assistants, etc. These devices created a paradigm shift where the traditional functionality of the mobile phone has transformed from a paradigm concerned with receiving and making calls to providing a powerful, poly-modal mobile computing device with telecommunication capabilities. For the majority existing MCD software applications, the primary means of interaction with an MCD is through the touch-screen—by pressing buttons or using swipe gestures. Force-feedback, however, is missing. For interfaces that utilize trackpads as found commonly in laptops, some desktop computers, and touch-screen MCDs, force-feedback is literally absent due its "touch-screen" interface designs. This is especially the case for MCD as the primary mode of content interaction is via the multi-touch-screen display.

SUMMARY

In general, one aspect of the subject matter described in this specification can be embodied in methods for receiving, from an accelerometer, angle information of a device. A calibration position is measured based upon the angle information of the device when the device is at rest. A current position is constantly measured based upon the angle information of the device. A current pressure is calculated based upon the current position and the calibration position. In one implementation, the current pressure is used to augment an audio signal. In another implementation, the current pressure is used to augment an audio instruction. Other implementations of this aspect include corresponding systems, apparatuses, and computer-readable media.

The foregoing summary is illustrative only and is not intended to be in any way limiting. In addition to the illustrative aspects, implementations, and features described above, further aspects, implementations, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

FIGS. 6A, 6B, 6C, and 6D illustrate another force-feedback mobile computing device setup in accordance with an illustrative implementation.

FIGS. 10A, 10B, and 100 illustrate elastic bands incorporated into a case in accordance with an illustrative implementation.

FIG. 20A shows the mounting system stowed, FIG. 20B shows the mounting system extended; FIG. 20C shows the mounting system engaging a rear view mirror; FIG. 20D shows the mounting system secured to a rear view mirror; FIG. 20E shows the mounting system wherein the height is adjusted by partially retracting the mounting system within the case.

FIG. 21A illustrates a partially retracted engaged mounting system having an indentation.

FIG. 24A shows the mounting system as it is being extended; FIG. 24B shows the mounting system extended with a lower retention bar is engaged with a blocking module.

FIG. 25A shows a top view of a portion of the locking mechanism with a rounded implementation tooth mechanism; FIG. 25B illustrates a perspective view of a portion of the locking mechanism with the locking mechanism pointing towards the left hand side and the track at the bottom of the support handle; FIG. 25C illustrates a side view of a portion of the locking mechanism where the locking teeth point away from the page and the track keeps the dual handle securely in place and aligned.

' FIG. 28A shows a vertically stowed filament; FIG. 28B shows a horizontally stowed filament; FIG. 28C shows a horizontal filament engaged with a support 22.

Figure 1:
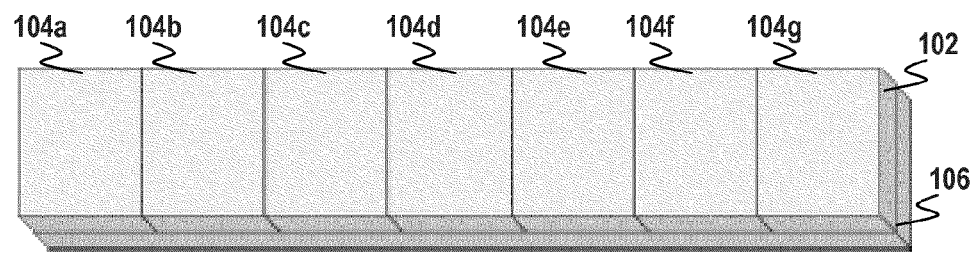
FIGS. 1 and 2 illustrate two layers of foam for use with a user input devices in accordance with an illustrative implementation.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

The touch-screen interfaces of computing devices generally lack an important feature: haptic force-feedback. This friction-based feedback plays an essential role in most human-machine interaction scenarios, whether when driving an automobile (steering, stepping on the accelerator), typing on the keyboard, or when playing traditional musical instruments (guitars, pianos, percussion instruments, etc.). The absence of force-feedback can diminish user control and interaction expressivity whether in the context of a gaming environment, musical instrument application, or when engaging with something simple as an Internet browser. This specification discusses providing force-feedback to a user of a user input computing device utilizing resistive material such as foam padding. In another described embodiment, force-feedback is provided using elastic bands with strategic use of sensors and software designs. In addition, this specification describes how force-feedback can be added to existing user input computing environment, and especially MCDs. In various implementations, the following four philosophies were kept in mind: (1) avoidance of permanent physical alteration to the device itself, (2) easiness in adding force-feedback to the device, (3) flexibility in modifying expressivity via hardware and/or software, and (4) exploitation of polysensory features of modern user input devices such as MCDs. Various implementations essentially augment expressivity by providing force-feedback for MCDs, for example. In one implementation, force-feedback can be achieved through a combination of foam padding and exploiting on-board accelerometers found in many standard MCDs. In other implementations, a padding material that has physical resistive reaction properties can be used to achieve force-feedback. In another implementation, this can be achieved through combination of elastic bands and utilizing standard graphical user interface (GUI) sliders also found in most MCDs.

For the majority of the touchscreen-based interactions, force-feedback is absent although it is critical in human-machine interaction situations. This is especially the case when using MCDs or computer-based user interfaces for musical expressivity including live performances with electronic instruments or when interacting with physically modeled software instruments.

Hardware Designs

Musical controllers are traditionally designed in two ways: (1) using off-the-shelf sensors and microcontrollers by permanently or semi-permanently attaching to them existing musical instruments; and (2) by building new instruments from scratch. These two types of design methodologies have the advantage of providing force-feedback but also suffer from issues including fragility, hardware maintenance, mass-production difficulties, accessibility, and high development cost. With the advent of modern tablets, smartphones, "phablets," and mobile computing devices in general, an additional design method can be considered to the way controllers are designed and built. This third approach exploits the inherent polysensory capabilities and efficient, all-in-one hardware features of MCDs typically include multitude of on-board sensors, wireless communication capabilities (WiFi and BlueTooth), computing power, battery life, and its mass appeal. Modern MCDs include a touch-screen, sophisticated accelerometer, alongside with buttons and cameras. MCDs are furthermore robust, take on a multifunctional role in daily life of modern women, men, and children, and are used ubiquitously by the general public. The primary mode of interaction for MCDs is the touch-screen. One serious deficiency with touchscreen-based MCDs as an expressive controller is the lack of force-feedback. Various implementations described herein describe an expressive force-feedback solution for touchscreen-based MCDs, which allows for augmenting MCD interaction expressivity and control in a multitude of applications ranging from, but not limited to, musical software, gaming software, business software, and general Internet browsing software.

Force-Feedback Using Resistive Materials

In one implementation, a resistive material, such as, foam padding material can be used. Other resistive materials, such as gels, one or more springs, plastics, etc., can be used.

Figure 2:
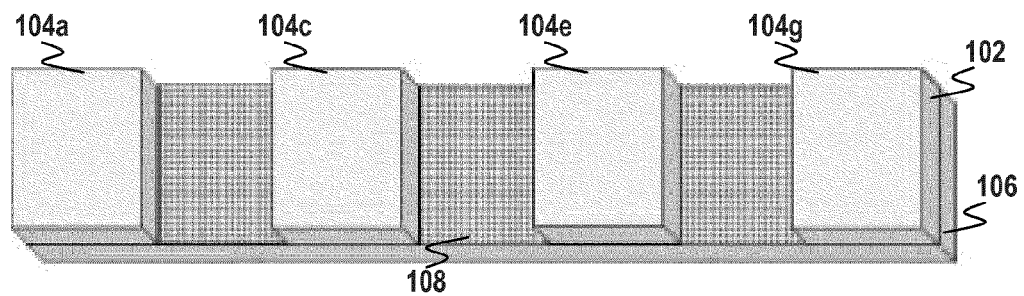

FIGS. 1 and 2 illustrate two layers of foam for use with a mobile computing device in accordance with an illustrative implementation. As seen in FIG. 1, there are two layers of foam. The top layer 102 is made up of smaller, equal-sized modular foam blocks 104a-g firmly placed in series on a single foundational foam pad 106. The smaller and modular top blocks 104a-g can be kept securely affixed to the bottom foundation 106 with adhesive materials such as hooks with loop fasteners 108 as shown in FIG. 2. In other implementations, the foam blocks 104a-g are not affixed to the foundation 106. In yet other implementations, the foam blocks 104a-g are affixed to the foundation 106 using adhesive. In the implementations using hooks with loop fasteners 108 or other attachment methods that allow for the removing of foam blocks, quick force-feedback adjustment and feel can be accomplished. For example, removing foam blocks can result in less resistance and smoother force-feedback and vice-versa. FIG. 2 shows three blocks removed to allow for softer force-feedback feel—a type of "subtractive-resistance" design approach.

Figure 3A:
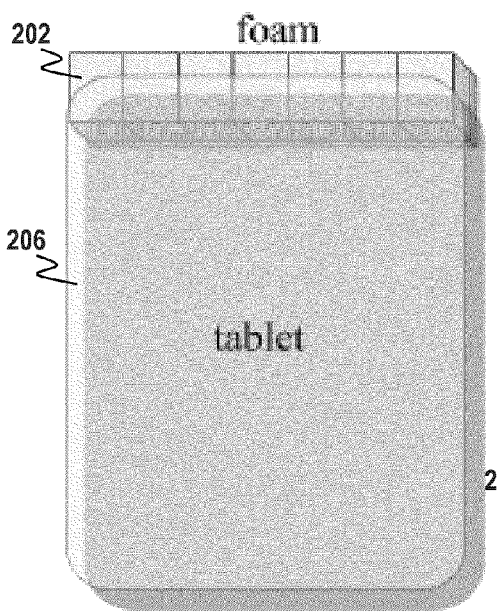
FIGS. 3A, 3B, and 3C illustrate a force-feedback mobile computing device setup in accordance with an illustrative implementation.
Figure 3B:
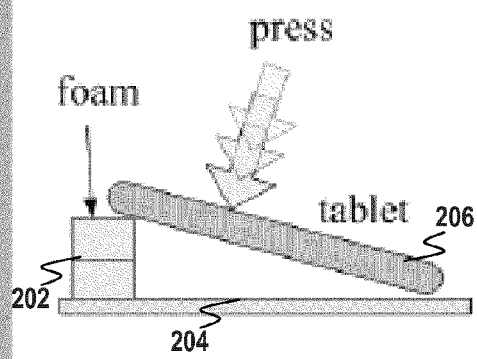
Figure 3C:
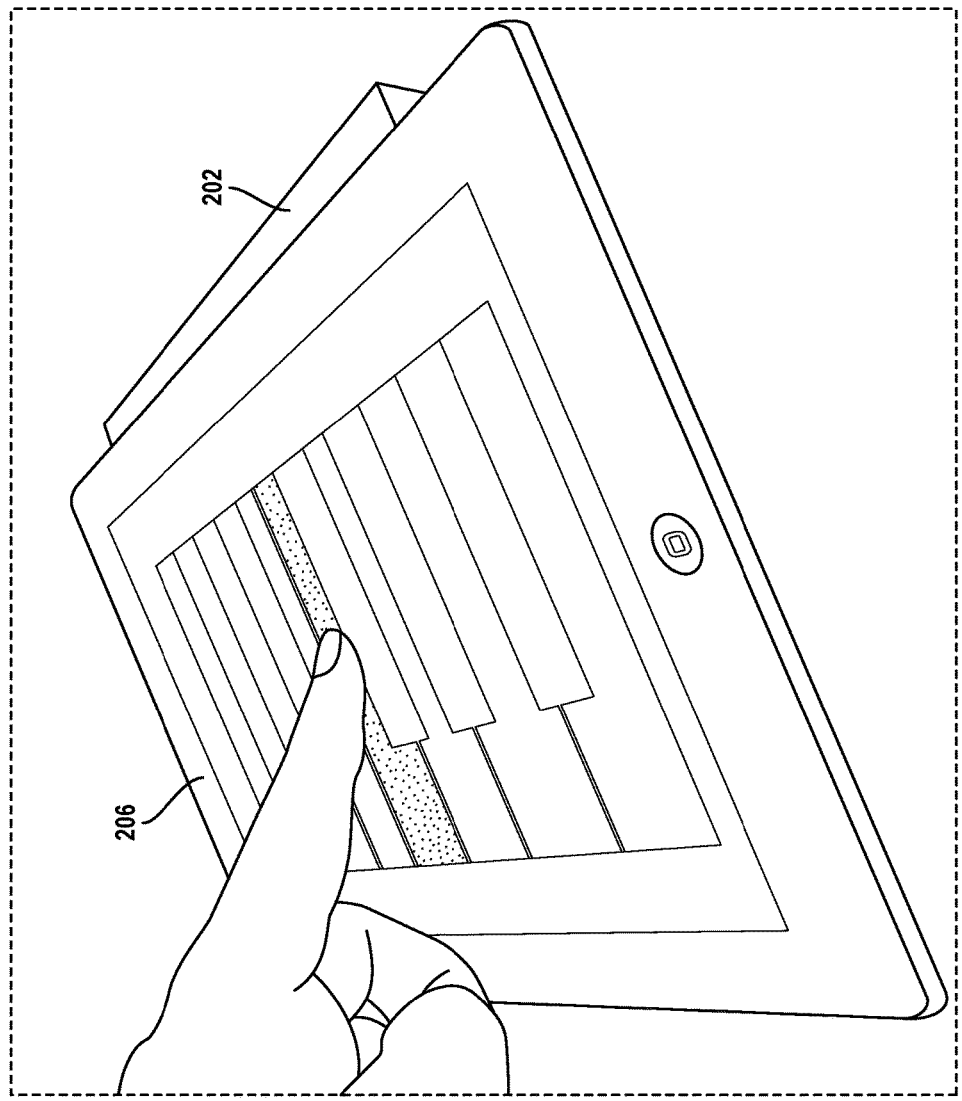

FIGS. 3A, 3B, and 3C illustrate a force-feedback MCD setup in accordance with an illustrative implementation. A foam block 202 can be placed on or at the edge of a surface 204, such as a table, resulting in an angled tablet configuration. When pressing on the touchscreen, force-feedback is accomplished by the absorption of pressure by the foam block 202 during user-touchscreen interaction. The on-board accelerometer of the MCD 206 is used to measure the amount of tilt with respect to its rest position when no pressure is applied. The accelerometer measurements can then be mapped to software-specific parameters. For example, for a musical instrument application the readings could be mapped to control musical parameters such as tremolo, vibrato, general aftertouch, filter behavior, amplitude envelope, and velocity. Specific mapping strategies allows for music augmentation that is being played or produced by the MCD 206. This same setup can be used for any other type of software application scenario including opening a door or depressing the accelerator in computer gaming applications.

Figure 4:
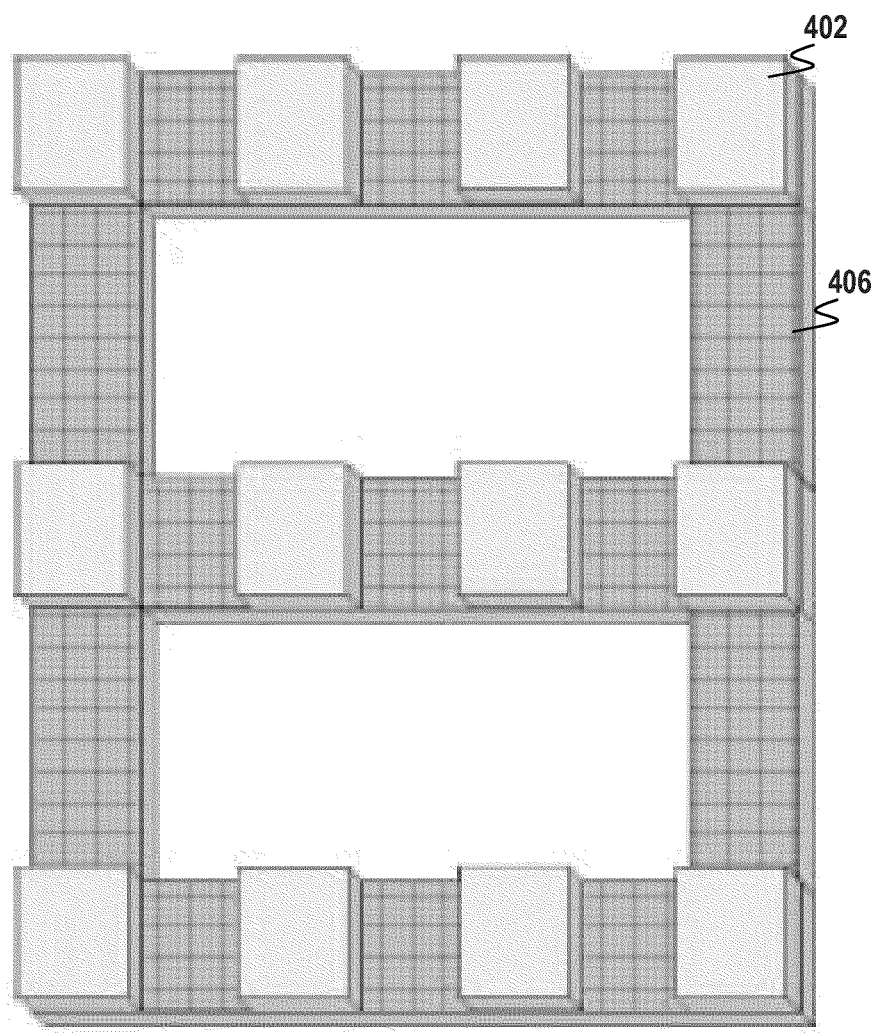
FIG. 4 illustrates two foam layers for use with a mobile computing device in accordance with an illustrative implementation.

A number of foam configurations have been tested and explored to render a robust and expressive "default" configuration. FIG. 4 illustrates one such "default" configuration. This configuration allows for substantial expressive control based upon the default tilt angle. The tilt angle, when the MCD 206 was pressed, can be directly proportional to expressive range. However, as described in greater detail below, other configurations such as a greater tilt angle, a smaller tilt angle, or no tilt angle are also possible depending on the desired application.

Figure 5:
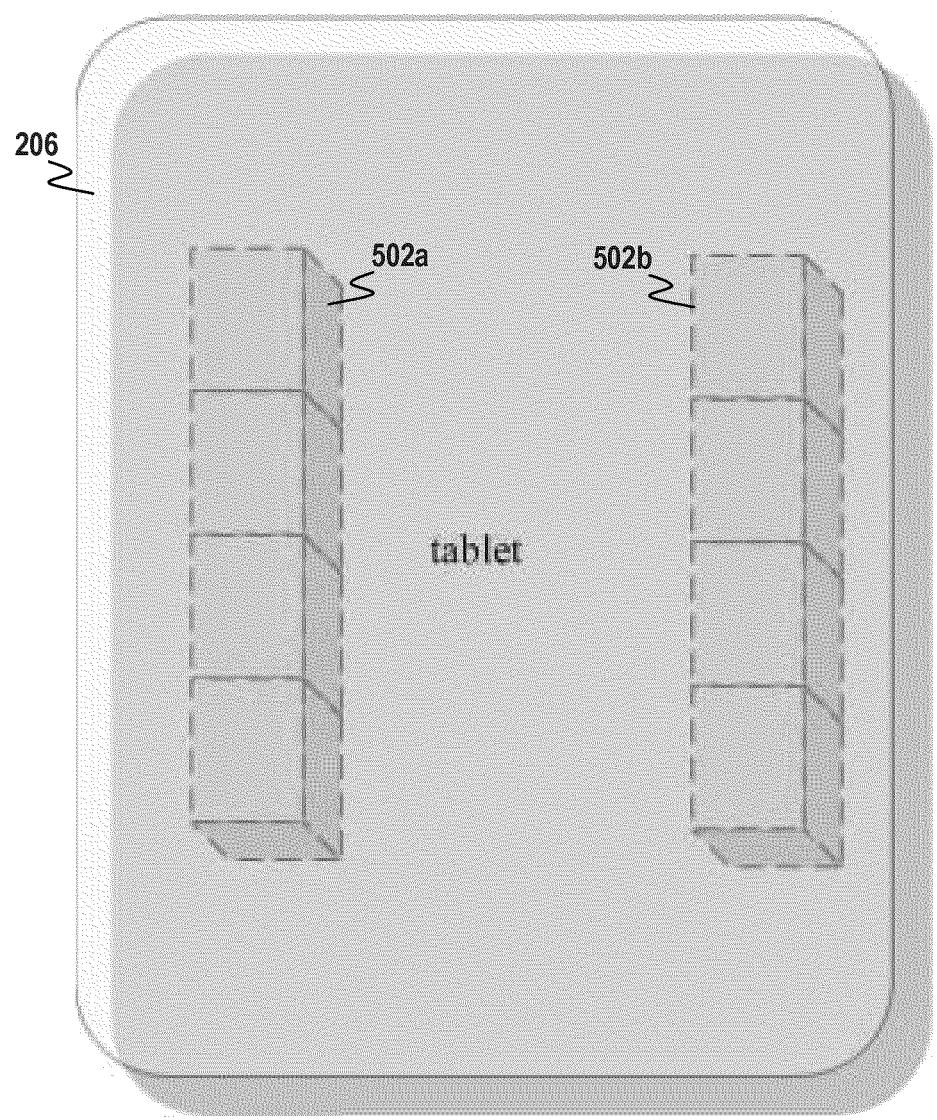
FIG. 5 illustrates another force-feedback mobile computing device setup in accordance with an illustrative implementation.

Another configuration uses multiple layers of foam (two in example), but without a tilt angle. FIG. 4 illustrates two foam layers in accordance with an illustrative implementation. In this implementation, the configuration of the foam layers 402 and 406 allows for a more distributed pressure configuration providing possibilities for expressive 2-dimensional mapping. The MCD can be positioned, such that the MCD is substantially parallel to a surface on which the foam layers 402 and 406 rest. Accordingly, there is no tilt angle between the MCD and the surface. When pressure is applied to the MCD, the MCD will tilt based upon the pressure and movement of the foam layers 402 and 406. The accelerometer can be used to measure the amount of tilt using the x and y accelerometer readings. This configuration can also be applied for transient response interactions (e.g. quick strike with force-feedback). In this scenario, the accelerometer's z-axis can be used to detect vertical acceleration-type interactions with added force-feedback. All of the interactions scenarios allow for force-feedback interactions with MCDs FIG. 5 illustrates another force-feedback mobile computing device setup in accordance with an illustrative implementation. Foam blocks 502a and 502b can be placed below the MCD 206. In this configuration, the MCB can tilt towards as well as away from a user.

Figure 6B:
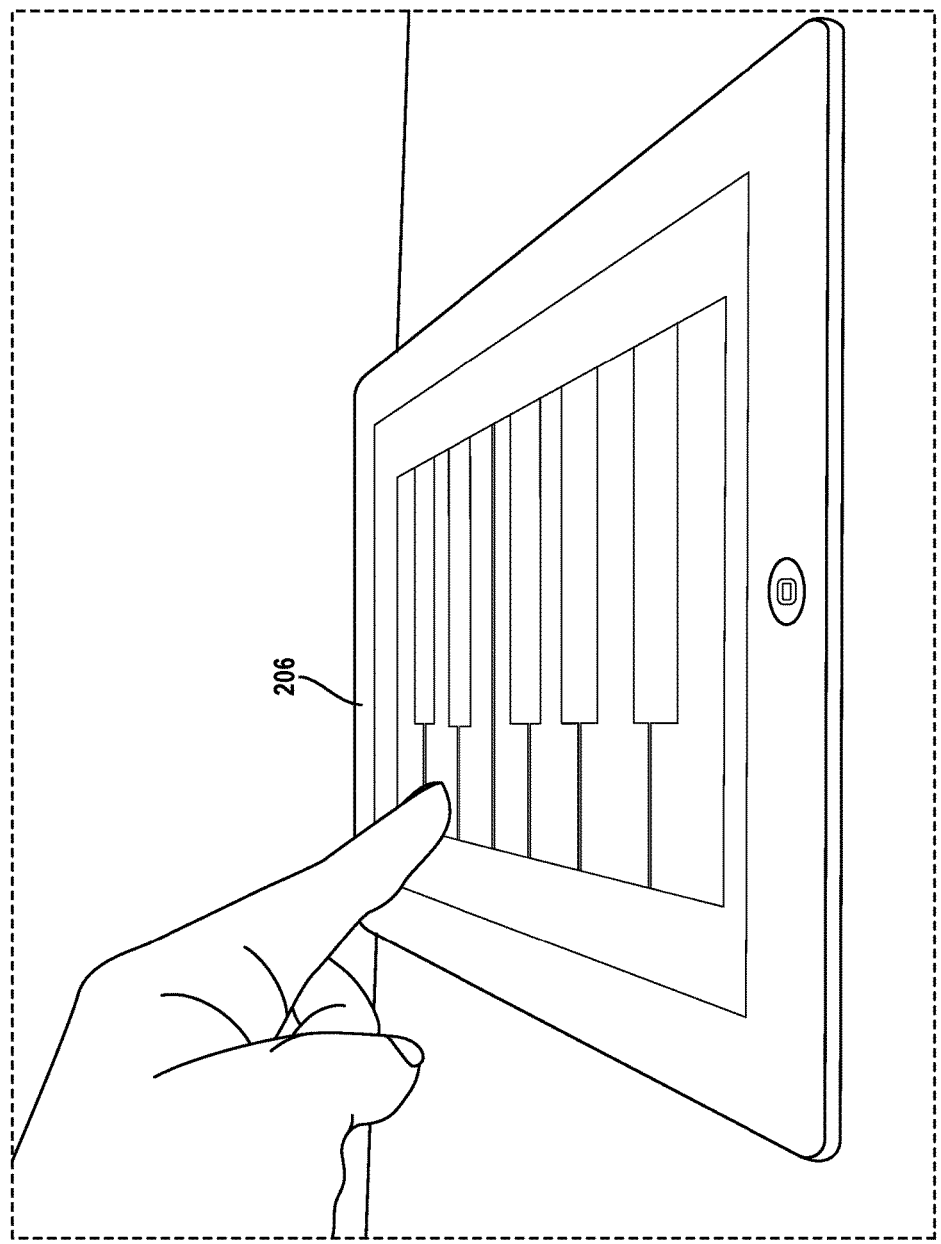
Figure 6C:
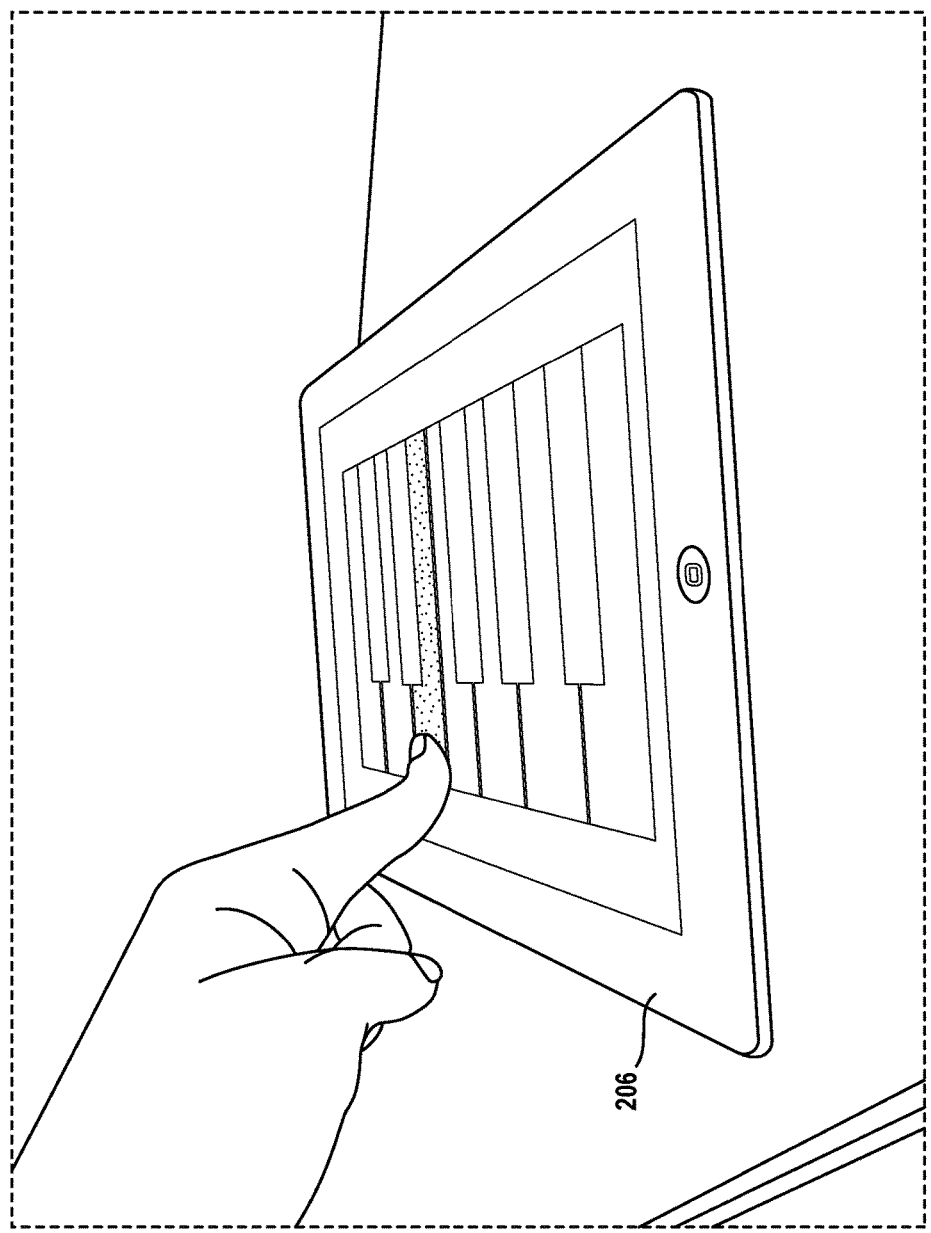
Figure 6D:
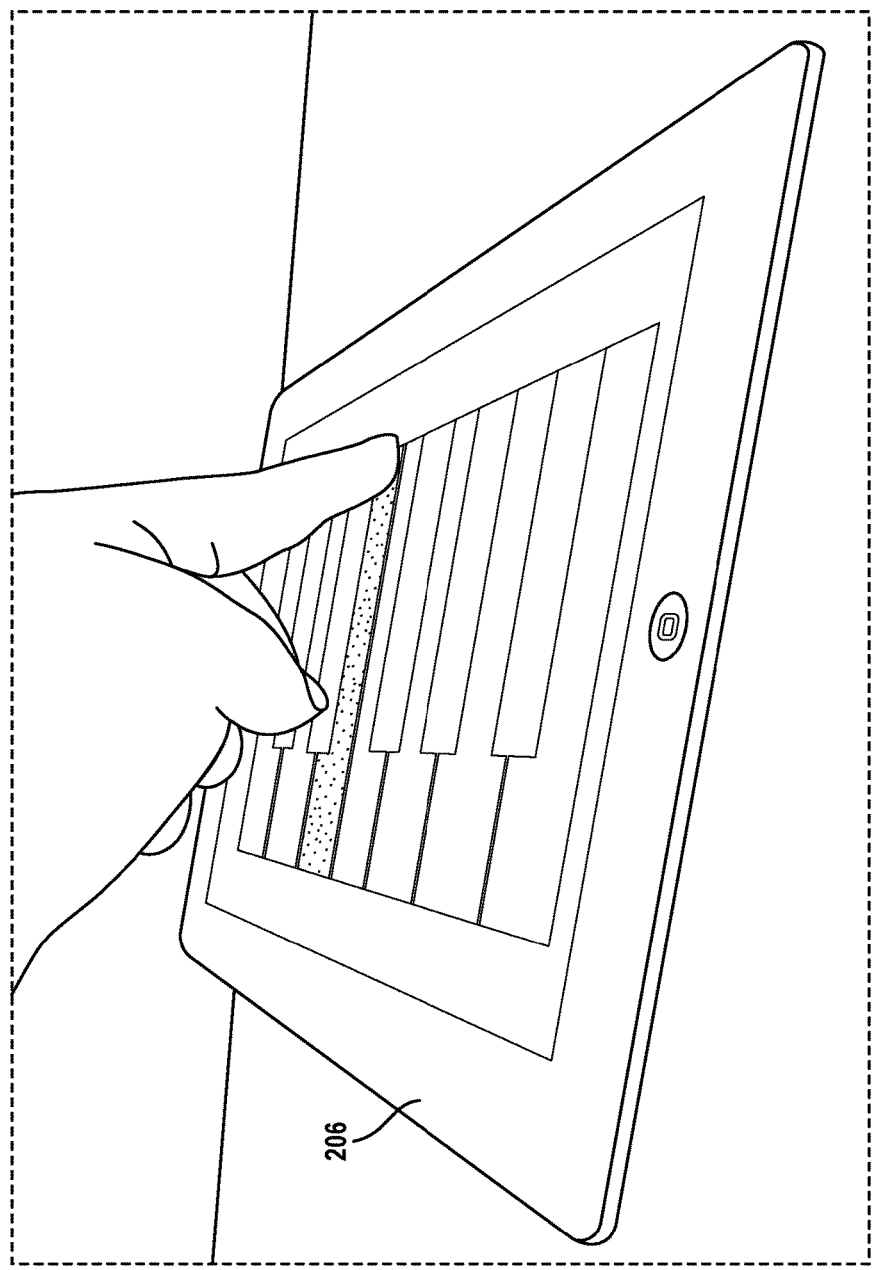

FIGS. 6A, 6B, 6C, and 6D illustrate yet another force-feedback mobile computing device setup in accordance with an illustrative implementation. A foam block 602 is placed underneath the MCD 206. The foam block is positioned towards the middle of the MCD 206. This allows the MCD to tilt towards or away from a user, as the user presses on the MCD 206. FIG. 6B shows the MCD in a neutral position such that MCD is balanced on the foam block 602. FIG. 6C shows the MCD in a tilted position toward the user. FIG. 6D shows the MCD in a tilted position away the user. This design allows for additional control and force-feedback as tilt is possible both towards and away from the user.

In another implementation, the foam padding can be secured to the MCD. In this implementation, the foam padding is secured to the MCD using adhesive, Velcro®, elastic bands at the top and bottom, or in the form of a custom MCD case commonly used for protecting smart-phones and MCDs in general. This setup enables the user to comfortably hold the MCD (e.g. a smaller smart-phone) in one hand while interacting with the device with the free hand. This interaction configuration provides force-feedback interaction and also allows great mobility as the user is no longer tied to a surface. In effect, the one hand holding the MCD acts like a table and the other hand can be used to control the MCD while the setup as a whole provides force-feedback and mobility.

Figure 7A:
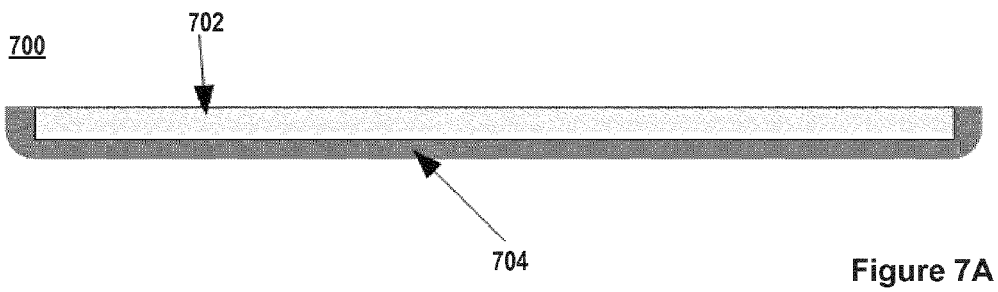
FIGS. 7A, 7B, and 7C illustrate a case that incorporates resistive material in accordance with an illustrative implementation.
Figure 7B:
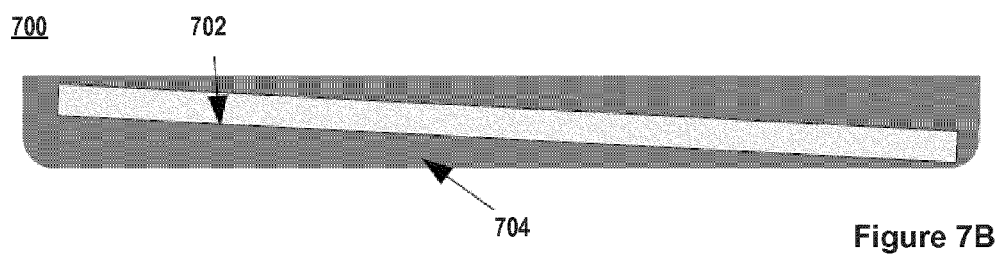
Figure 7C:
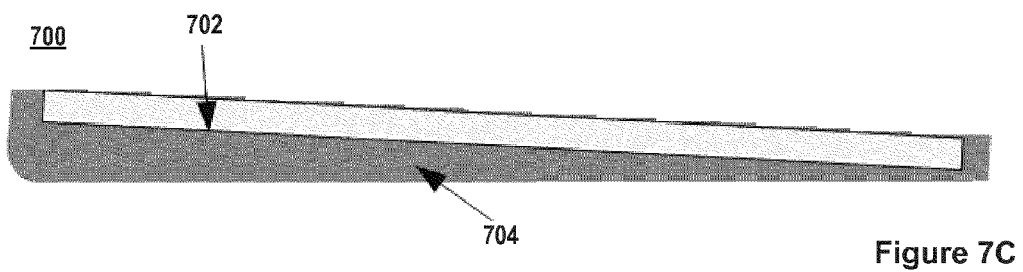

In one implementation, the resistive material can be integrated into a case that holds the MCD. FIGS. 7A, 7B, and 7C illustrate a case 700 that incorporates resistive material. The case 700 holds a mobile computing device 702 and incorporates the resistive material 704. These implementations can be helpful as they have dual functionality: (1) acting to provide force-feedback and (2) protecting the MCD when in transit, for example.

Force-Feedback Measurements

In various implementations, force-feedback measurements are based upon readings from the accelerometer of the MCD. These readings, in combination with resistance from the foam/cushion material, can be used to mimic force-feedback-based user interaction. In certain implementations, a calibration of the system is done when the MCD is in its rest position. For example, in FIG. 3, the calibration is done with the MCD resting on the foam padding 102 without pressure applied improving performance. In one implementation, calibration can be accomplished by pressing a reset button in the GUI of the MCD. In some implementations, there is also a second calibration procedure to allow for improved expressivity. This second calibration procedure includes capturing the maximum displacement of the tablet (at rest to fully depressed) in order to set the maximum accelerometer range for a given session. This second calibration procedure, however, can be bypassed and use the default fixed movement range instead.

Pressure Sensitivity Options

Figure 8A:
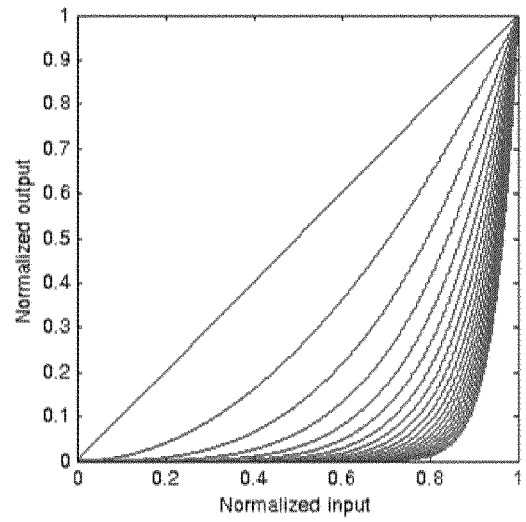
FIGS. 8A, 8B, and 8C illustrate different pressure types used in a force-feedback mobile computing device in accordance with an illustrative implementation.
Figure 8B:
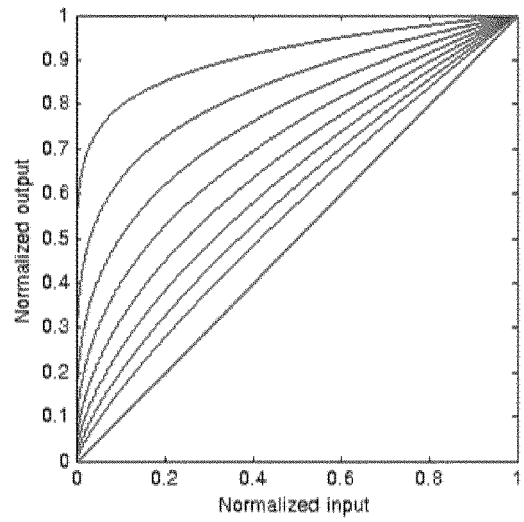
Figure 8C:
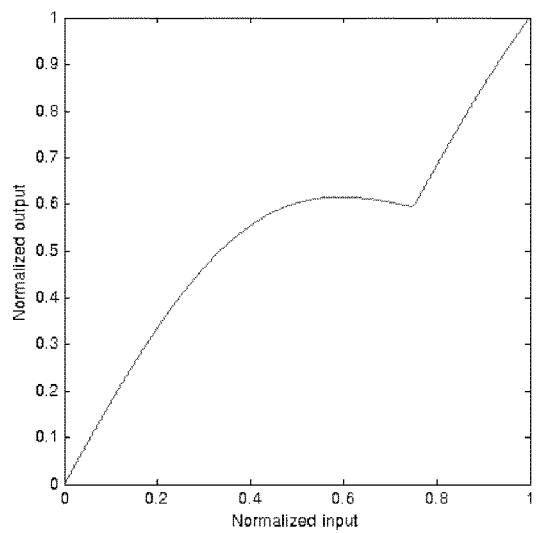

In lieu of physically changing the sensitivity of the force-feedback, a number of software pressure settings can be used. These can be readily accessible via a typical GUI setup/configuration interface. FIGS. 8A-8C show various types of pressure settings in accordance with an illustrative implementation. These pressure settings can be used to map accelerometer data to a pressure amount. As described above, the pressure amount can be used to augment user interaction-based expressivity and control. The accelerometer data and pressure values can be normalized. For example in these examples, the accelerometer data is normalized to values between 0.0 and 1.0, with 0.0 representing a tilt amount at rest and 1:0 representing a maximum tilt or movement amount. The pressure values can also be normalized to values between 0.0 and 1.0, with 0.0 denoting zero pressure and 1.0 the maximum pressure that the system is able to track. The pressure can then be used to augment user expressivity and control. For example, the pressure amount can be mapped to the amplitude or the pitch of a software-based musical instrument. The mapping can alter the audio signal in various ways. In another example, the minimum amount of pressure could leave the amplitude/pitch unchanged, where a maximum pressure amount could produce double the amplitude/pitch of the software instrument and linearly changing values between the minimum and maximum ranges. This could also be extended to other functions like scroll speed for GUI interfaces, velocity characteristics of objects in computer games, pressure sensitive button, sliders, and pan-pots, etc.

FIGS. 8A-8C illustrates different pressure types that can be used in a force-feedback mobile computing device in accordance with an illustrative implementation. This includes the linear mode, exponential model, and a logarithmic mode. The logarithmic mode can be efficiently implemented with a single equation. Additionally, a custom mode can also be defined by the user via a GUI input, for example (8C).

The straight line in both FIGS. 8A and 8B is the simplest mapping function with a 1:1 input to output relationship, where the input and output follow the general relationship expressed as $y=x^p$. Here, y is the output and x the input accelerometer readings. In the linear mode, the power parameter p is a constant: p=1. This setting does not bias the input and output relationship and can be particularly expressive in rendering tremolo and vibrato performance techniques. Vibrato and tremolo-like interaction can be simply achieved by rubbing the GUI button which is similar to guitar playing techniques and akin to "channel aftertouch" that is provided for high-end electronic musical keyboards.

The exponential mode shown in FIG. 8A whereby the power parameter p is set to positive value greater than 1.0. The greater the p, the more curvature in mapping the input and output. The interaction result is that more pressure will have to be exerted for affecting the output the greater the value of p. The greater the value of p, the closer the interaction will be to a "button" (on/off) rather than a sliding-type interaction interface (continuous).

The "logarithmic" pressure interaction is shown in FIG. 8B which can be approximated by using a power p value that is bounded by limiting it to: 0<p<1. As before, when p=1, the mapping is linear. If p>1, the behavior is like an exponential function. If p is between 0<p<1, then the interaction will be an inverse exponential mapping of input to output. FIG. 8B shows the mapping output starting p=1 (linear) and ending at p=0.1 at 0.1 decrements. The logarithmic pressure mapping allows for highly sensitive interaction—small pressure values will lead to large outputs.

FIG. 8C shows an illustration of the custom mapping mode where the mapping of input to output can be user-defined. One illustrative example of this pressure type would be to map ⅓ of the input pressure to a logarithmic curve and the remaining region to a more linear curve as shown in FIG. 7C.

Accelerometer

When using the 3rd generation iPad® and its on-board accelerometer an average sampling rate of 30 Hz was achieved with floating point values ranging from approximately −1.271802 to +1.215422 (for full range). A typical accelerometer reading in the implementation shown in FIG. 3 resulted in a range of 0.0 and 0.2 providing approximately 200,000 possible discrete values of accelerometer readings. The combination of the amplitude resolution of the accelerometer and sampling rate of 33 milliseconds allows the use of accelerometers for the system to be very accurate and sensitive. Accordingly, the accelerometer data can be used to augment and/or control musical applications in real-time.

The augmentation and/or control of musical applications can include controlling a MIDI interface or any device that can receive data via MCD wired and wireless I/O. For example, the MCD can be used to output MIDI messages to drive an internal (MCD application) sound synthesizer, for example. The MIDI messages can be augmented based upon the calculated pressure value as described above. The augmented MIDI messages can then be sent to a remote/external MIDI device. The remote MIDI device can then respond to the received MIDI control messages. For example, the remote MIDI device can be a sound synthesizer capable of receiving MIDI input. In this example, the calculated pressure values can be used to create pressure sensitive sliders, pan-pots, buttons, and other standard GUI interface objects. In addition, velocity trigger modes can be integrated with "handle" modes by exploiting the z-axis of the accelerometer. This allows for a handle and button combination interaction set up for one or more GUI objects controlling other hardware such as lighting systems, video projection, etc.

Augmenting data based upon calculated pressure data is not limited to augmenting audio parameters. The force-feedback based upon the pressure data can also be used in video games. For example, an accelerator of a car in a racing game can be pressed by a user. The amount of pressure applied to the accelerator can be used to control the amount of acceleration of the car in the racing game. As another example, the calculated pressure data can be used to control the width of a paint brush in a paint utility application. Another example, the calculated pressure can be used to simulate playing an instrument in a video game. Yet another example, the calculated pressure can be applied to provide force-feedback when pushing a heavy door opposed to a light door.

Elastic Bands

Figure 9:
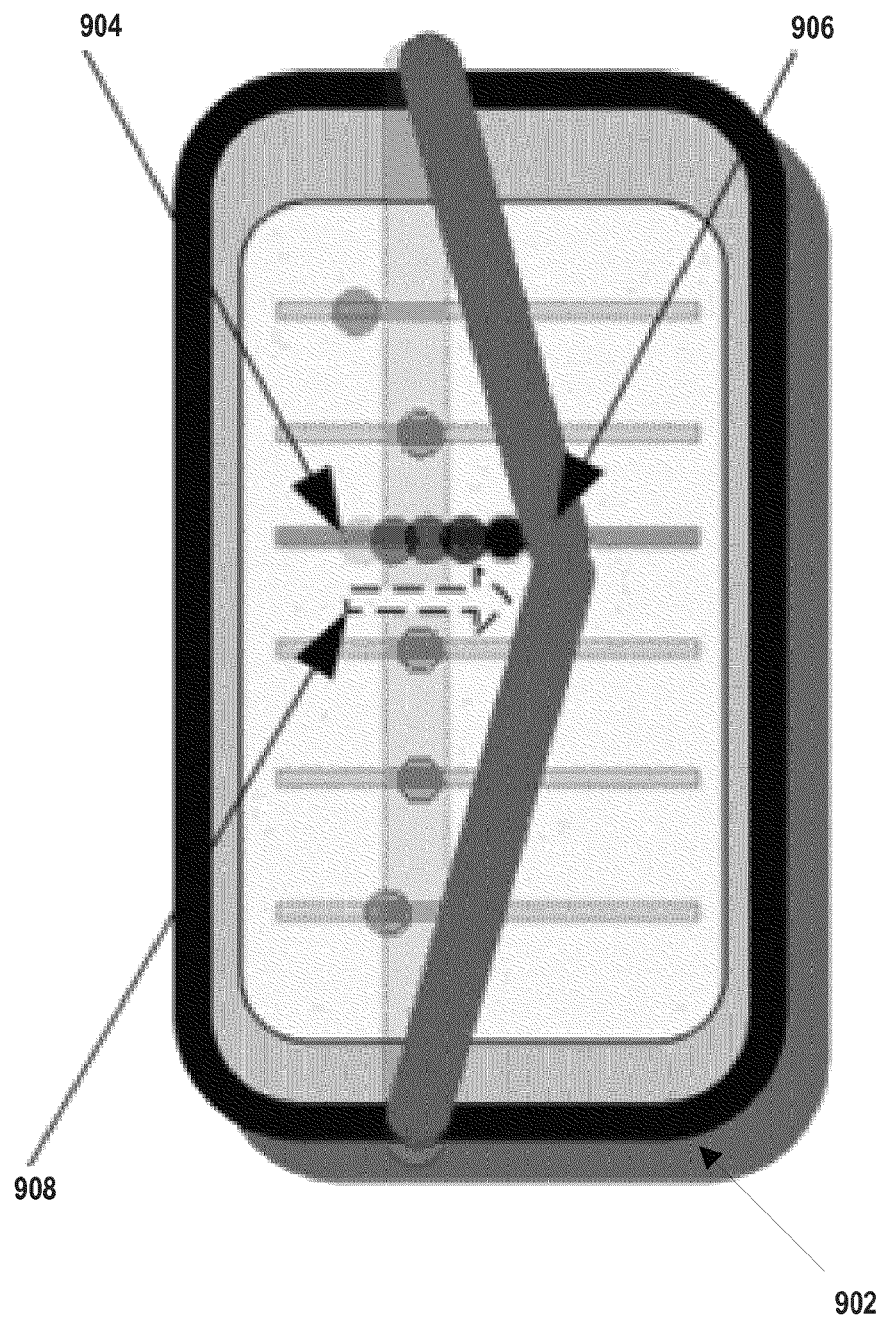
FIG. 9 illustrates an elastic band providing force-feedback for a GUI element in accordance with an illustrative implementation.

Force-feedback can be provided to a device as described above. In another implementation, force-feedback can be used to provide users with tactile expression using elastic band materials that are placed on a MCD such that the band stretches over the display of the MCD as shown in FIG. 9. The MCD 902 can be used in various MCD interaction scenarios including flipping webpages, software applications for musical instrument performance, or gaming environments such as bow-and-arrow games, golfing games, sling-shot games, or providing force-feedback for games such as Angry Birds®. In the case of Angry Birds®, there would be no need for software modification or hardware modification to the existing MCDs.

The elastic band can be positioned such that interaction with band, which is placed over the touch-screen results in tactile force-feedback. The elastic band has an initial position 908. Tactile force-feedback is achieved by combining user interaction with the band and touch-screen GUI objects, such as GUI sliders 904 as shown in FIG. 9. For example, the band can be used to mimic a physical stringed instrument as illustrated in FIG. 9 with GUI sliders. When a user moves the GUI slider 904, the elastic band will also move to a position 906 and provide a tactile force-feedback to the user.

Figure 10A:
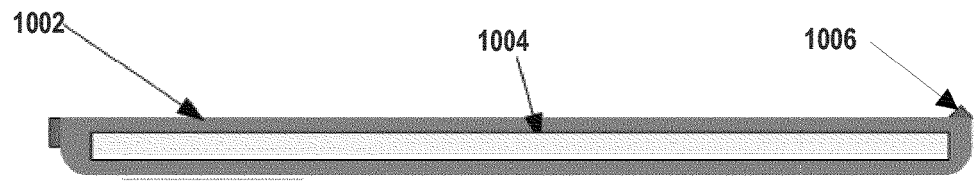
Figure 10B:
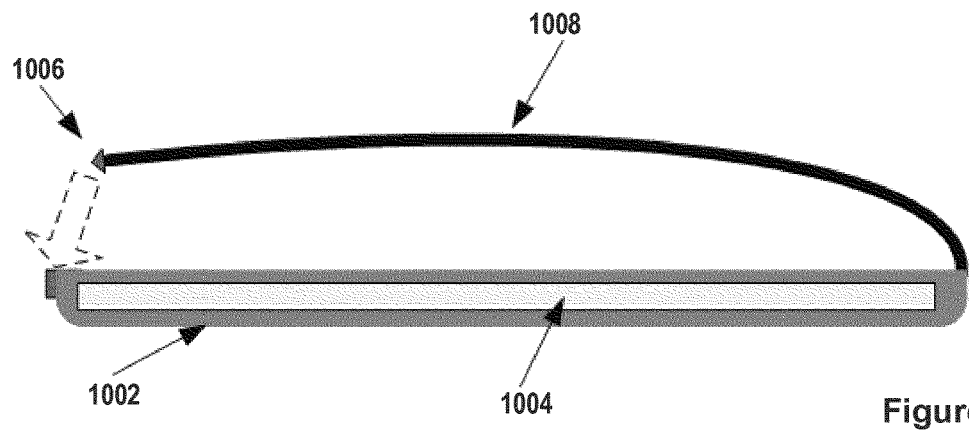
Figure 10C:
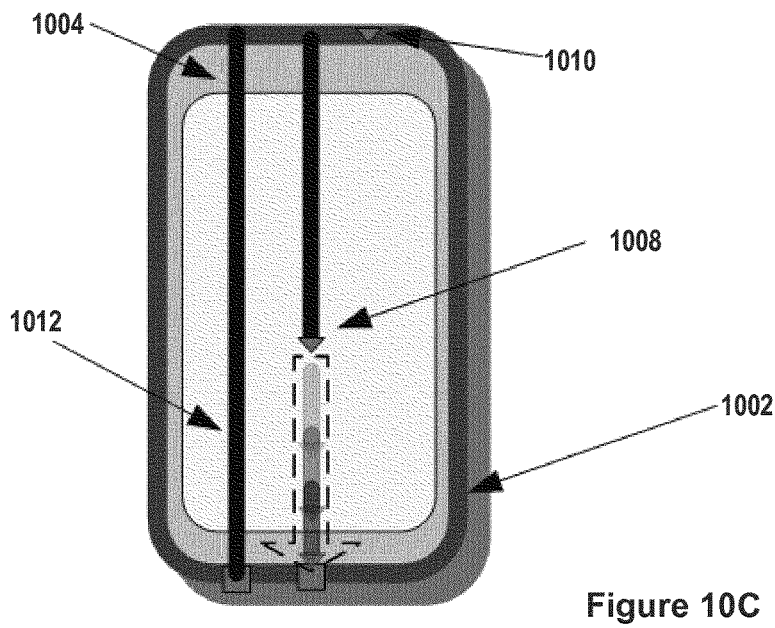

FIGS. 10A-10C illustrate one or more elastic bands incorporated into a case 904 in accordance with an implementation. In this implementation, the bands can be incorporated into a case 902. For example, an elastic band 908 can retract into the case. In the retracted state, a tip 1006 of the elastic band 1008 is visible. Using the tip 1006, the elastic band 1008 can be uncoiled and secured to another portion of the case 1002. For example, an elastic band could be secured to the case 1002 via magnets, notches, etc. In one implementation, the case 1002 can have notches that secure an elastic band via a node at the end of the elastic band. Multiple elastic bands 1012, 1008, and 1010 can be integrated into the case 1002.

As shown in FIGS. 10A-10C, the elastic bands 1008 and 1012 are attached vertically to the MCD with each elastic band mimicking strings. In other implementations, the elastic bands can be attached horizontally. The pluck velocity and the ensuing tactile force-feedback can be rendered by using standard (visible or invisible) GUI sliders and its displacement readings as shown in FIG. 8. In these implementations, the user interacts with the string and the touch-screen where a pluck of the string is measured by the slider's displacement amount when the user plucks the string. The slider displacement is rendered with a swipe action on the touch-screen. The band itself acts to provide tactile force-feedback. The combination of the two provides for tactile force-feedback interaction with applications running on the MCD or when driving remote software applications. The use of elastic bands allows for placement of single or multiple strings, depending on size of MCD; orientation of the string placement (vertical or horizontal for more strings but shorter frets, for example). This configuration also allows for multiple "frets" depending on number of sliders employed with force-feedback similar to playing a small guitar. This set up can be built as part of standard MCD protection cases as shown in FIGS. 10A-10O.

FIG. 10B depicts the side view when the elastic band is being uncoiled/extended to "click-on" to the opposite side on of the MCD (this example shows the vertical configuration but can also be used in horizontal band mode). FIG. 10A shows the coiled/retracted state of the elastic bands which allows for normal use of the MCD. FIG. 10O shows the same design from the top. The elastic bands do not have to be fixed and can move side-to-side for custom placement as needed by the user.

Figure 11:
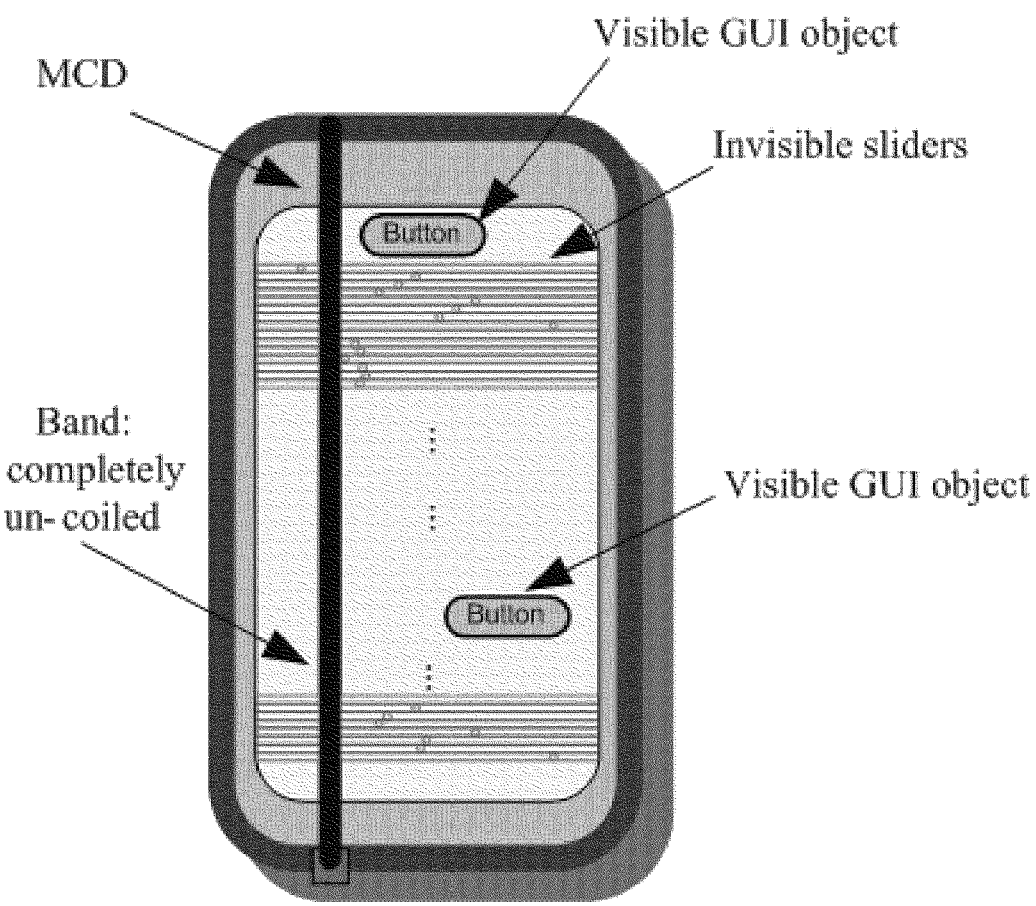
FIG. 11 illustrates an elastic band providing force-feedback for an invisible GUI element in accordance with an illustrative implementation.

The GUI sliders can be visible or invisible to the user. In the latter, the background of the display canvas will be visible. Another configuration example is shown in FIG. 11. Here the sliders are "invisible" and form the background of the display. The invisible slider in effect allows for the band interaction measurement on a horizontal pixel level, which can allow up to a maximum of 120 invisible horizontal sliders or 720 vertical invisible sliders for modern smartphones.

Figure 12:
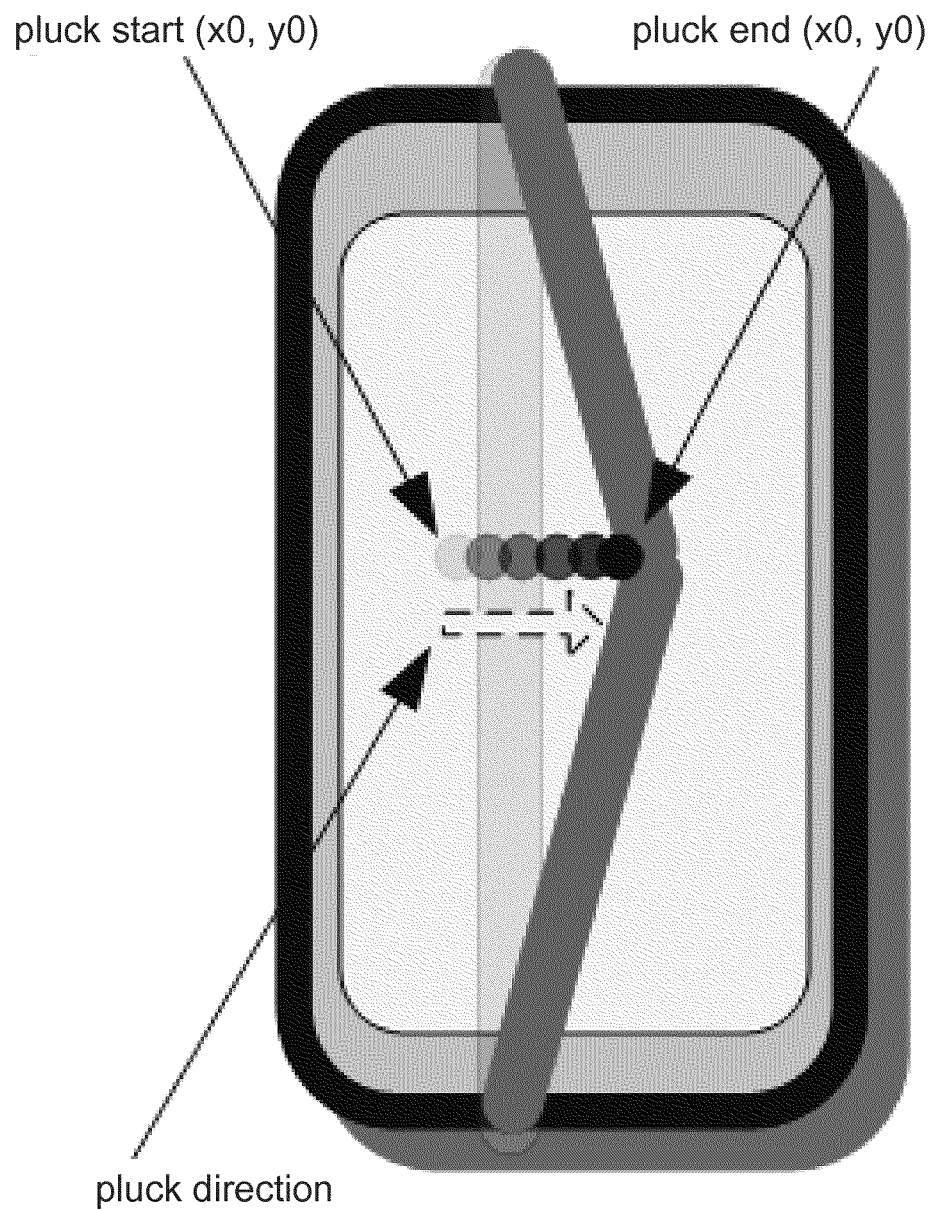
FIG. 12 illustrates an elastic band providing force-feedback in accordance with an illustrative implementation.

In another implementation, sliders are bypassed entirely. In this example, the entire screen becomes accessible where the starting point x,y coordinates and ending point x,y coordinates are used to determine pluck intensity. Pluck velocity, for example, could simply be computed by computing:

$$v = \frac{d}{t} = \frac{x_1 - x_0}{t_1 - t_0},$$

where d is the distance, t is time, x1-x0 is the distance moved, and t1-t0 is duration of the pluck. This is shown in FIG. 12. The change in the y-direction can also be used. For example, the change in the y-direction can be measured and used to produce a slide effect. For example, the initially y-position can be used to determine a starting pitch and the ending y-position can be used to determined the ending pitch. The starting pitch and the ending pitch can be used to generate a slide effect.

Figure 13:
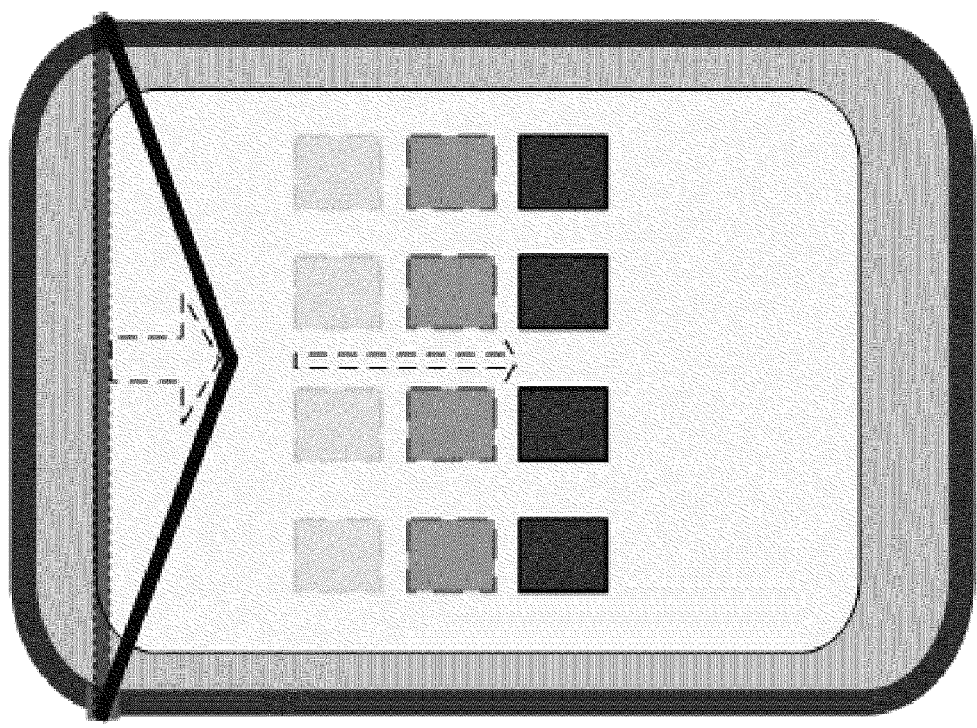
FIG. 13 illustrates an elastic band providing force-feedback to flip through pages in accordance with an illustrative implementation.

FIG. 13 shows another configuration in horizontal mode used to flip through application pages on a tablet. In this example, a simple sideways "pluck" is shown.

Figure 14:
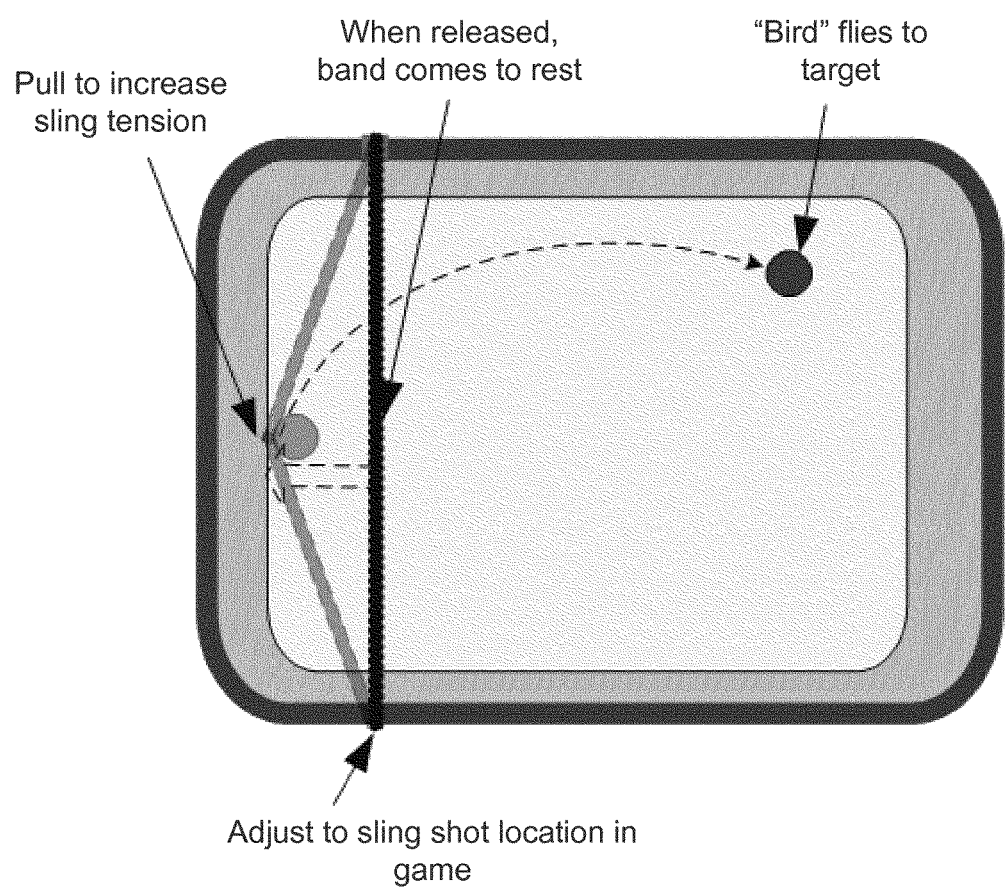
FIG. 14 illustrates an elastic band providing force-feedback for a GUI element in accordance with an illustrative implementation.

FIG. 14 shows another configuration used for the popular game Angry Birds®. In this example, the band is used to provide force-feedback as one would expect when increasing tension of the sling-shot in the game. The sling shot is pulled from its rest position and released to shoot the "bird" towards the desired target. No software or hardware modification is need to the existing software or MCD.

Figure 15:
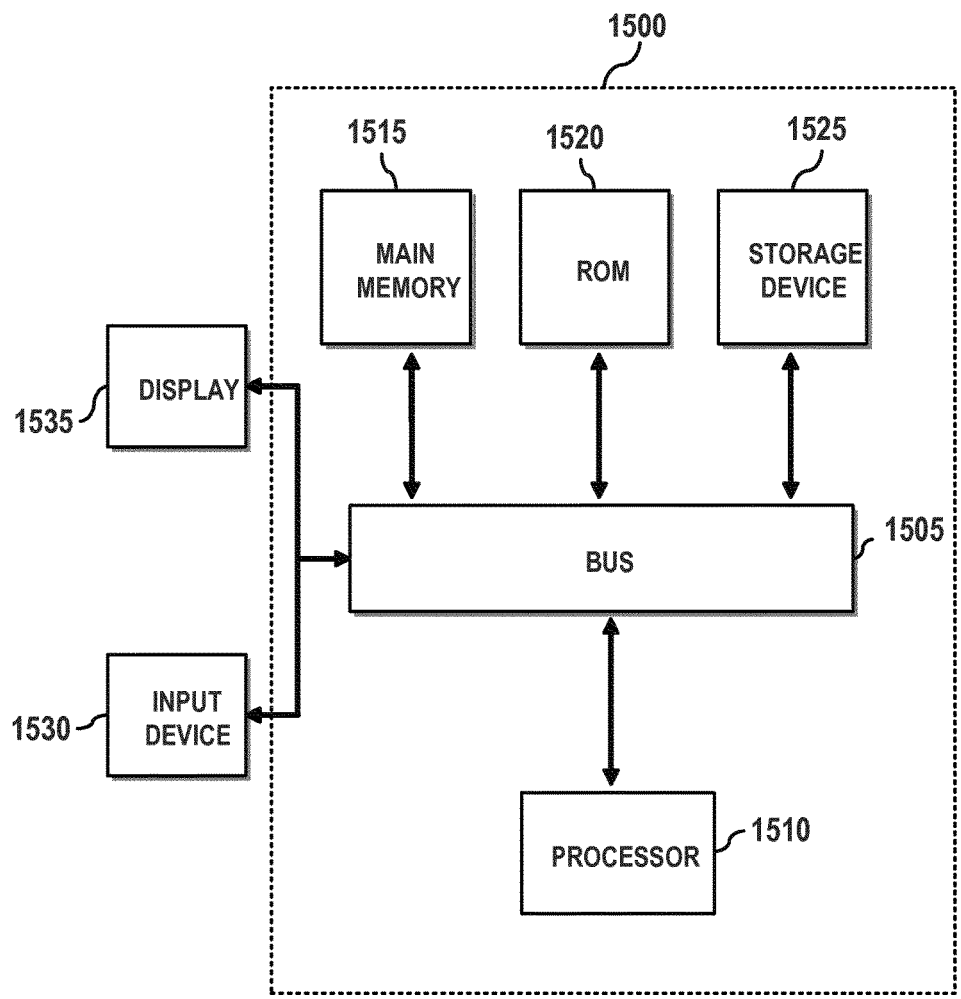
FIG. 15 is a block diagram of a computer system in accordance with an illustrative implementation.
Figure 16:
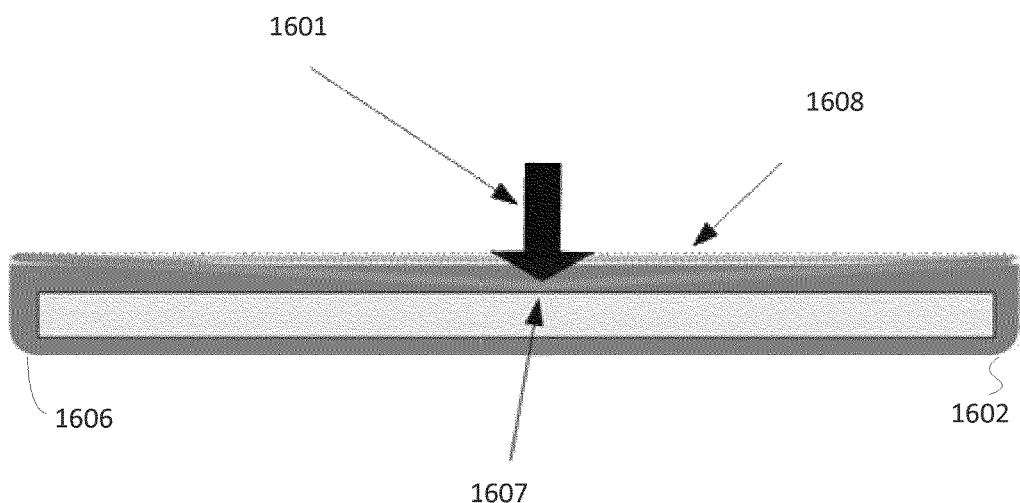
FIG. 16 is an illustration of an implementation utilizing conductive strings.

FIG. 16 is an illustration of an implementation utilizing conductive strings. The device 1602 shown in FIG. 15 includes a touch screen 1607, which is typically not flush with the outermost surface of the device 1602. This is particularly true where a case 1606 surrounds the device 1602. As most touch screens require physical contact to register a "touch", the user must depress the string 1608 (for example at 1601) sufficiently to also engage their finger with the screen 1607. However, in one implementation, the string 1608 is conductive or otherwise interactive with the touch screen 1607. For example, the string 1608 may be conductive elastic string, including through the use of a conductive coating. Thus, in this implementation, the user need not touch the screen with their finger, but only engage the string 1608 so the string 1608 touches the screen 1607.

Figure 17:
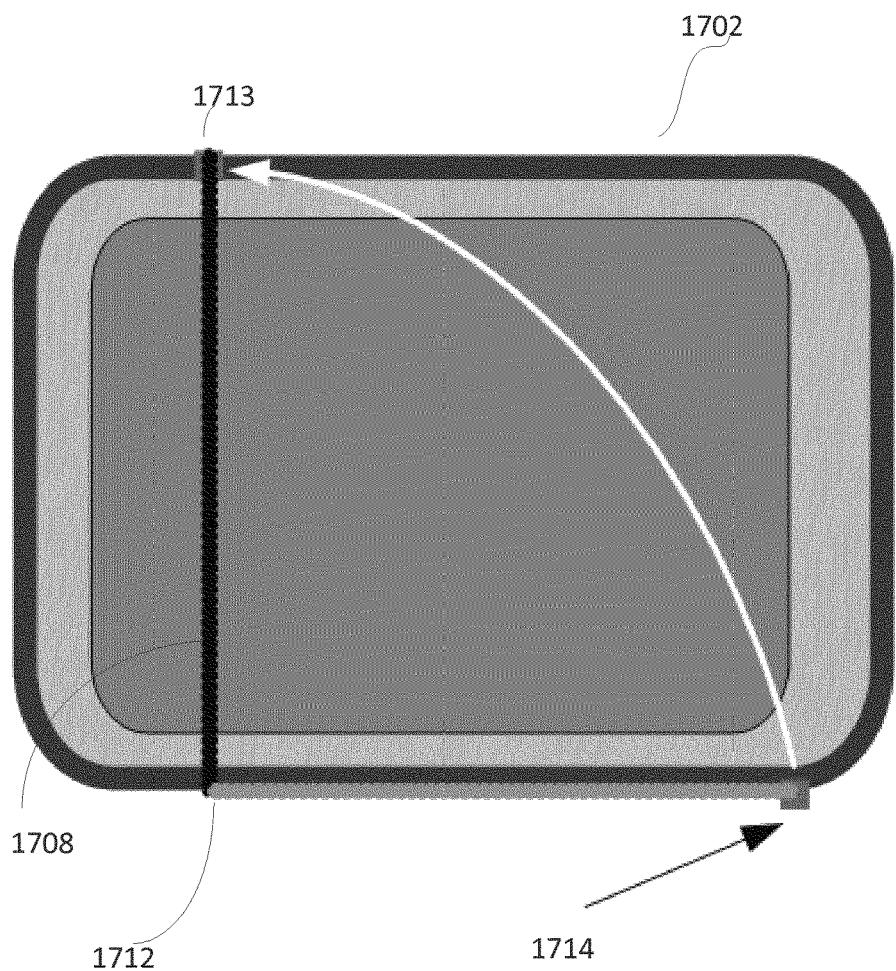
FIG. 17 is an illustration of an implementation with an alternative string storage mechanism.

FIG. 17 is an illustration of an implementation with an alternative string storage mechanism. The string 1708 is connected to the device 1702 (or to a case) at a first location 1712. That connection may be a pivotable connection allowing the string to rotate relative to the device 1702. The string 1708 can be connected across the screen of the device 1702 at play mode location 1713. The play mode location removably secures the string 1708 across the screen. A rest mode location 1714 is positioned along the same side of the case or device 1702 as the first location 1712. The rest mode location 1714 removably secures the string 1708 so as to not obstruct the screen. The rest mode location 1714 and the play mode location 1713 may comprise clamps and can be moveable either in a continuous way or with moveable "grid units" so that it can be adjusted and customized to different software applications. Multiple strings can be attached either horizontally and/or vertically.

Figure 18A:
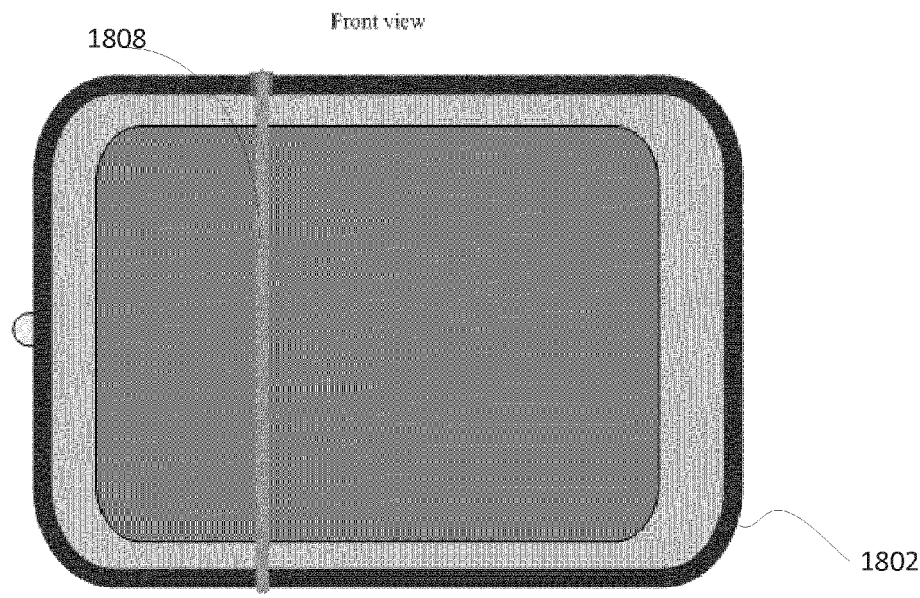
FIGS. 18A and 18B are illustrations of an implementation utilizing electroactive polymers.
Figure 18B:
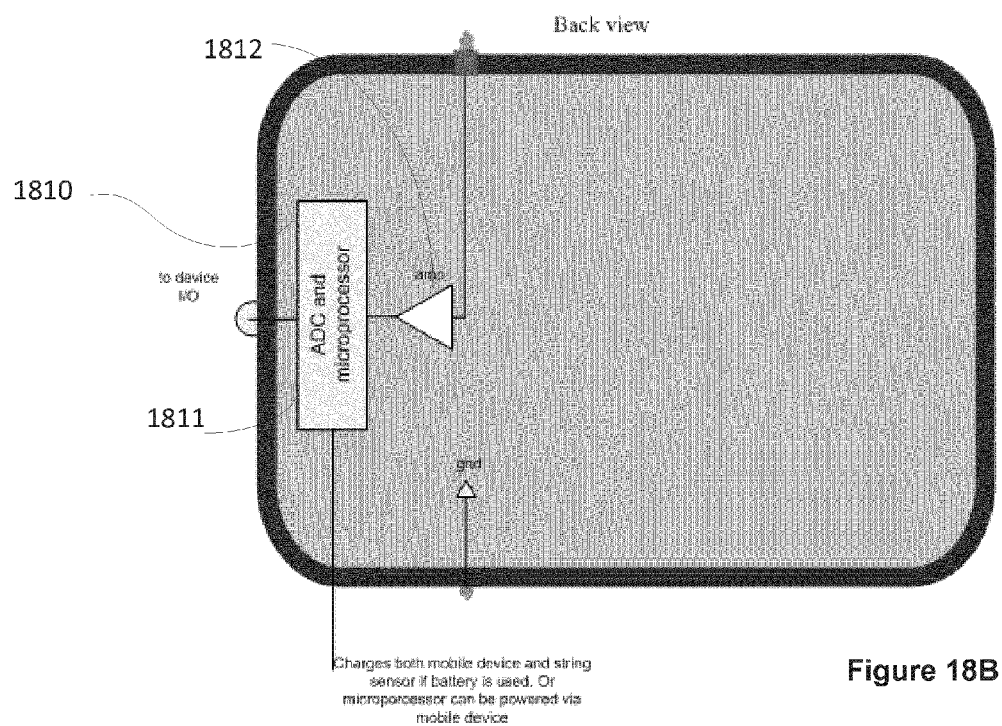

FIGS. 18A-B are illustrations of an implementation utilizing electroactive polymers ("EAP"). The strings 1808 comprise one or more EAP. Using EAP, electrical energy will be produced when plucking the string 1808. Plucking strength and electrical energy produced will be proportional. A processing mechanism 1810 can translate the electrical energy into information about the interaction with the string 1808. For example, the energy can be amplified and converted to a digital signal, such as by an amplifier 1812 and an analog-to-digital converter 1811. The digital signal can be sent to mobile device for processing, mapping, visualization, etc. This can be done via simple connection to device I/O interface or via WiFi/Bluetooth built into microcontroller or the like. The processing mechanism 1810 can be charged or connected to computer via identical I/O format on add-on in case.

FIG. 15 is a block diagram of a computer system in accordance with an illustrative implementation. The computer system or computing device 1500 can be used to implement a mobile computing device, cell phones, clients, servers, etc. The computing system 1500 includes a bus 1505 or other communication component for communicating information and a processor 1510 or processing circuit coupled to the bus 1505 for processing information. The computing system 1500 can also include one or more processors 1510 or processing circuits coupled to the bus for processing information. The computing system 1500 also includes main memory 1515, such as a random access memory (RAM) or other dynamic storage device, coupled to the bus 1505 for storing information, and instructions to be executed by the processor 1510. Main memory 1515 can also be used for storing position information, temporary variables, or other intermediate information during execution of instructions by the processor 1510. The computing system 1500 may further include a read only memory (ROM) 1520 or other static storage device coupled to the bus 1505 for storing static information and instructions for the processor 1510. A storage device 1525, such as a solid state device, magnetic disk or optical disk, is coupled to the bus 1505 for persistently storing information and instructions.

The computing system 1500 may be coupled via the bus 1505 to a display 1535. An input device 1530, such as a keyboard, may be coupled to the bus 1505 for communicating information and command selections to the processor 1510. In another implementation, the input device 1530 has a touch screen display 1535. The input device 1530 can include a cursor control, such as a mouse, a trackball, or cursor direction keys, for communicating direction information and command selections to the processor 1510 and for controlling cursor movement on the display 1535.

According to various implementations, the processes described herein can be implemented by the computing system 1500 in response to the processor 1510 executing an arrangement of instructions contained in main memory 1515. Such instructions can be read into main memory 1515 from another computer-readable medium, such as the storage device 1525. Execution of the arrangement of instructions contained in main memory 1515 causes the computing system 1500 to perform the illustrative processes described herein. One or more processors in a multi-processing arrangement may also be employed to execute the instructions contained in main memory 1515.

Mounting System

Figure 19A:
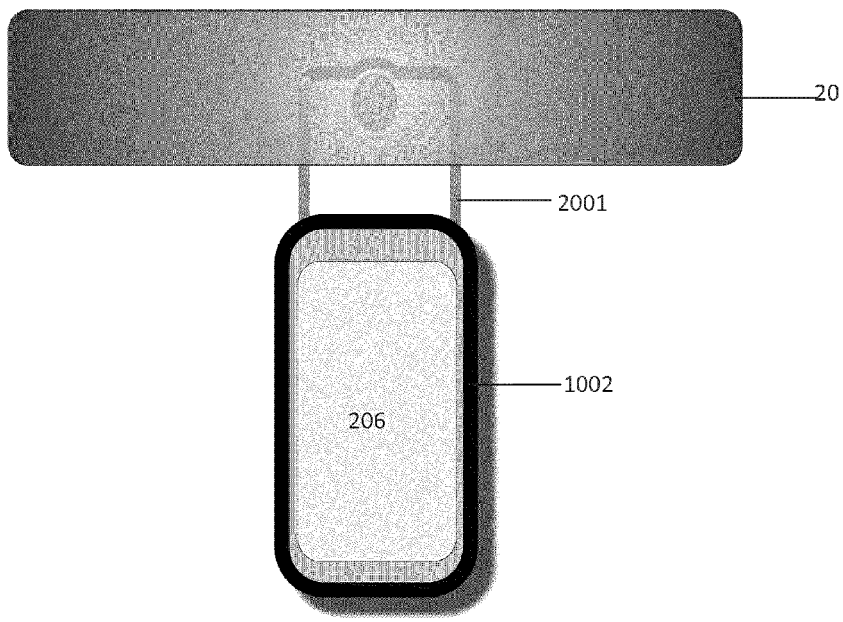
FIG. 19A illustrates a front view of one embodiment of a mounting system attached to rearview mirror.
Figure 19B:
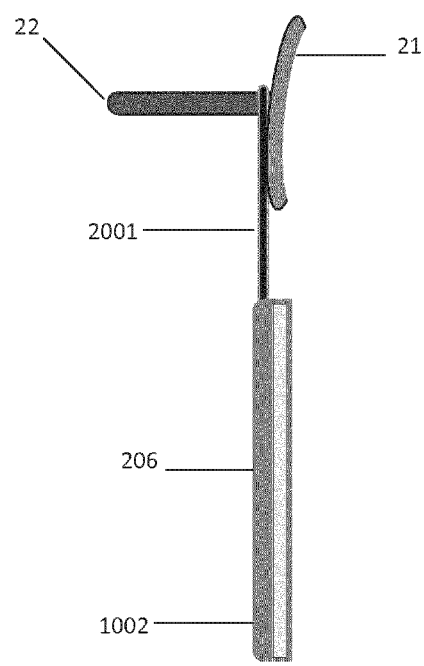
FIG. 19B illustrates a side view of the mounting system of FIG. 19A.

In one implementation the mobile computing device (MCD) case 1002 is augmented in its functionality and utilized as a hands-free, MCD mounting system 2001. The mounting system 2001 illustrated in FIG. 19A-B is applicable for hanging a MCD from an object such as for situations as commonly encountered during travel in automobiles. FIGS. 19A and 19B show a typical scenario where the case is attached to the support of a rearview mirror as commonly found in automobiles as well other situations.

The mounting system 2001, which allows it to function like a conventional and traditional MCD case that has found great utility in protecting the MCD 206, and in this implementation, the case 1002 further functions as mounting device 2001 for, but not limited to, automobiles, freeing the hands for full focus on driving without the need for additional hardware such as windshield/dashboard MCD mounting hardware. Not only does the mounting system 2001 allow for hands-free navigation, it also strategically positions the MCD 206 in an area where drivers constantly and commonly seek information—traffic behind the automobile. As such, the positioning of the MCD 206 is not only in a familiar location, but in a location where the driver's vision is expected to focus on during situations such as passing vehicles, making turns, or backing out of garages, for example. Helpfully, this position is also typically viewable by passengers in the automobile. The mounting system 2001 greatly helps in keeping the driver's eyes in front, around the windshield, and around the rearview mirror location, thus, contributing to safety while driving and utilizing navigation software that is commonly installed in MCDs, for example. As mounting system 2001 is part of the case 1001 with no external additional hardware needed to be carried or installed, the system 2001 can be set up and removed from such places as rearview mirror systems easily and safely.

Figure 22A:
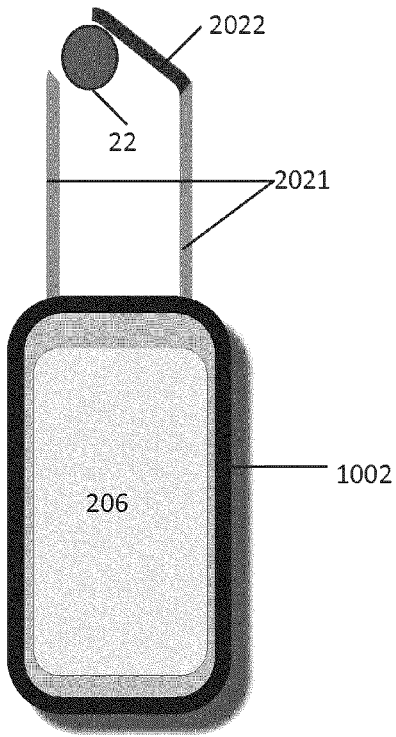
FIG. 22A illustrates the mounting system detaching and initializing a rear view mirror.

A mounting system 2001 includes mounting frame 2020 having a vertical support 2021, preferably but not limited to, two parallel vertical supports 2021a, 2021b, engaged with a horizontal handle 2022 at or adjacent a first end of the vertical supports 2021. The vertical support 2021 is stowable within the case 1002. In one embodiment, the vertical support 2021 is slidable to be disposed entirely or substantially within the case 1002 and extendable from the case 1002, such as extendable a length substantially equal to the length of the case 1002. For example, the vertical support 2021 may form a "u" shape in conjunction with the horizontal handle 2022. In one embodiment, the horizontal handle 2022 is perpendicular to the vertical support 2021. The horizontal handle 2022 is hinged to allow at least a portion of the horizontal handle 2021 to pivot relative to the vertical support 2021. It should be appreciated that in alternative embodiments, the movement may be one or more of pivoting, bending, flexing, and rotating. The horizontal handle 2022 thus provides an open state (e.g., FIG. 20C and FIG. 22A) and a closed state (e.g. FIG. 20B) (as well as transitions between those states). In the open state, a support 22, such as the post of a rearview mirror 21, can pass between the horizontal handle 2022 and the vertical supports 2021. In the closed state, the support 22 is encompassed by the vertical supports 2021, the horizontal handle 2022, and the case 1002 having the MCD 206.

Figure 20A:
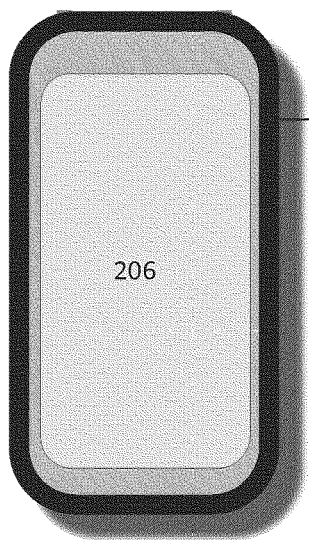
FIGS. 20A, 20B, 20C, 20D and 20E illustrate views of a MCD in a case having a mounting system.
Figure 20B:
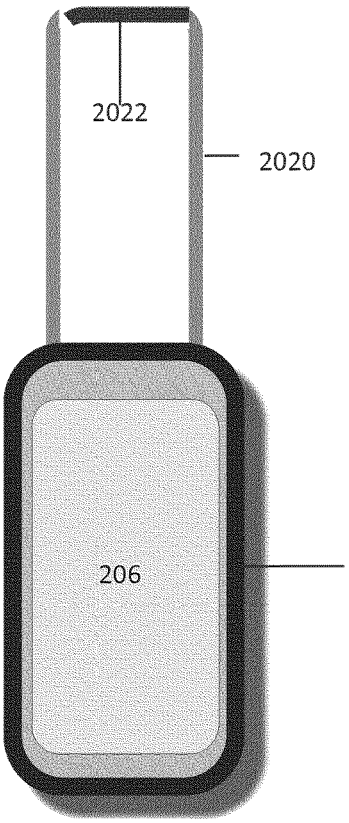
Figure 20C:
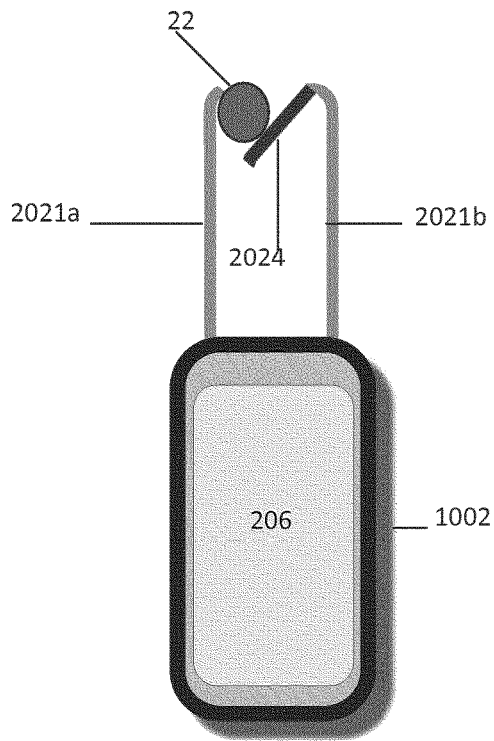
Figure 20D:
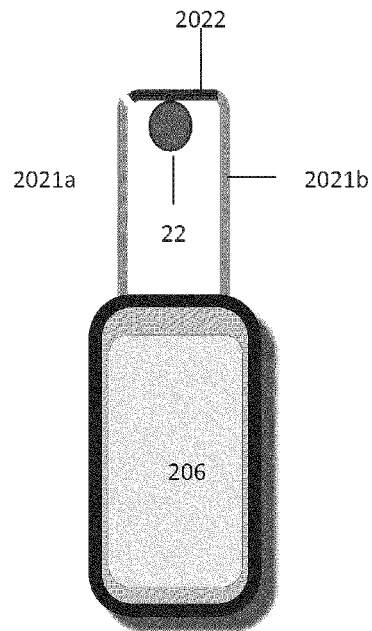
Figure 20E:
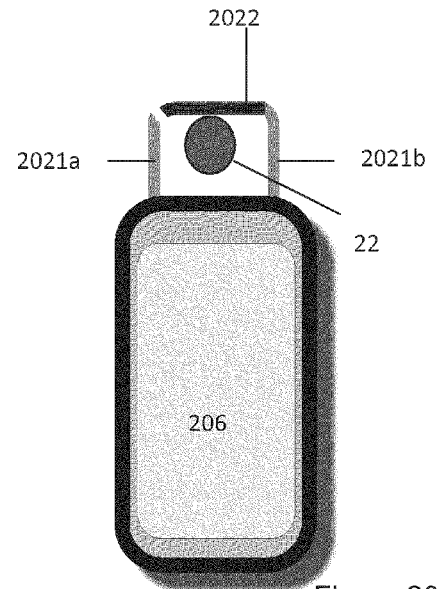

The procedure for setting up mounting system 2001 for rearview mirrors 21 is shown in FIG. 20A-FIG. 20E. In FIG. 20A, mounting system 2001 is in its initial state where it looks, feels, and functions similar to traditional MCD cases and acts as to protect the handheld device. FIG. 20B show the mounting system 2001 holding mechanism pulled out of the mounting system 2001 case—the amount of retraction of the holding/support system is adjustable and can be approximately as long as the height of the MCD 206. As shown in FIG. 20C, the MCD 206, having the mounting system 2001 in an extended state, is pushed against the rearview mirror support 22. Specifically, the horizontal handle 2022 is pressed against the support 22. This causes the pivoting portion of the horizontal handle 2022 to pivot, creating an opening, which allows it to be secured to the rearview mirror support 22 by "capturing" the support 22 within the frame 2020. The pivoting portion 2024 is biased to a closed state and once the support 22 passes through the created opening, the pivoting portion 2024 pivots back to a closed state securing the MCD 206 to the rearview mirror 21. The height of the mounting system 2001 can then be adjusted to the user's needs as further described below: flush against the bottom of the rearview mirror or hanging further away as needed. In one embodiment, one or more of the horizontal handle 2022, the pivoting portion 2024, and all or a portion of the vertical supports 2021 have a high-friction surface, such as a rubbery materials or coating, to utilize frictional forces to further secure and stabilize the position of the MCD 206. In another implementation one or more of the horizontal handle 2022, the pivoting portion 2024, and all or a portion of the vertical supports 2021 present a flat surface for engaging the support 22, for example rather than rounded, to allow maximal contact area—and thus friction and in turn stability—between the MCD 206 and support 22, additionally helping to movement issues.

Figure 21B:
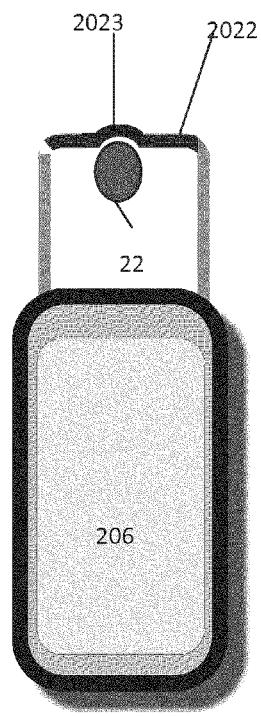
FIG. 21B illustrates a partially retracted engaged mounting system having a second horizontal handle below the rearview mirror and also having an indentation.
Figure 21B:
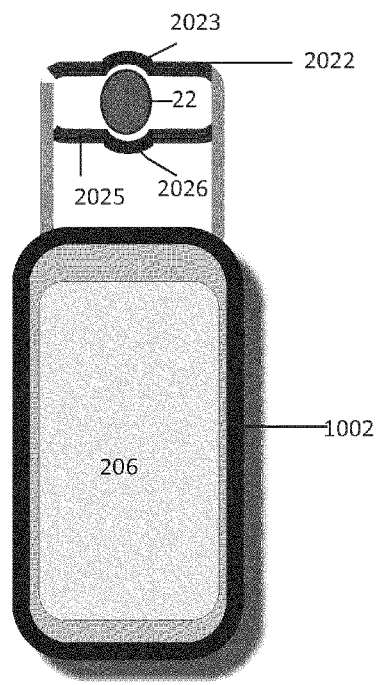

In another implementation, shown in FIG. 21A, the horizontal handle 2022 includes an indent 2023, notch or the like configured to receive the support 22, such as the support portion of a rear view mirror 21. The indent 2023 may be position entirely on the pivoting portion 2024 or may only include portion thereof on the pivoting portion 2024. The indent 2023 contributes to minimizing movement and securing the MCD 206 to the support 22, such as the rearview mirror support 22 of FIG. 21A. In another implementation, shown in FIG. 21B, to additionally make the mounted MCD 206 prone to less movement, a lower horizontal fastening handle 2025 can be below the horizontal handle 2022, preferably configured to be a distance slightly greater than the thickness of the support 22. This allows for added stability as the upper horizontal handle 2022 and the lower horizontal handle 2025, particularly where the upper horizontal handle 2022 has an indent 2023 and the lower horizontal handle 2025 has a corresponding indent 2026, will secure, effectively clamping around the support 22. The horizontal handles 2022, 2025 can be covered and/or be created with high friction material such as rubber to maximize stability. In one alternative, one or more of the horizontal handle 2022 and the lower horizontal handle 2025 comprise flexible and/or elastic material, allowing for the respective handle to deform around the support 22 to accommodate it and provide for a more secure mounting.

The entire set up procedure: (1) retracing the mounting system 2001, (2) securely snapping the mounting system 2001 onto the support 22 (pushing motion), and (3) optionally adjusting the length as necessary is quick, easy, and extremely intuitive.

Figure 22B:
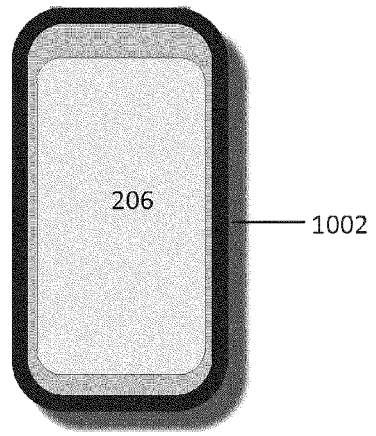
FIG. 22B illustrates the MCD of FIG. 22A with the mounting system stowed.

In a further embodiment, the mounting system 2001 handle is at rest and horizontal to the MCD 206 and can be bent towards and away from the MCD 206. This design allow for quick, easy, and uncomplicated release of the MCD 206: (1) pulling of the MCD 206 to engage the support 22 with the pivot portion 2024, pivoting the pivot portion 2024 away from the MCD 206 (FIG. 22A), allowing removal of the support 22 from the frame 2020 and (2) pushing mounting system 2001 back into the case 1002 which will result in transforming the MCD case 1002 back to its normal state as shown in FIG. 22B (similar to the starting state of FIG. 20A). In another implementation, the pivot portion 2024 of the horizontal handle 2022 pivots different amounts: (1) pivoting towards MCD 206 is less resistive and (2) pivoting away from the MCD 206 is more resistive which allows for extra safety as releasing the MCD will require a little more force when pulling. This allows for scenarios where heavier MCDs' inadvertent release is minimized. The bias exhibited by the pivoting portion against movement from the resting state may be accomplished by mechanisms known in the art, such as use of a living hinge, material properties, or external bias forces such as springs or elastic materials.

Figure 23:
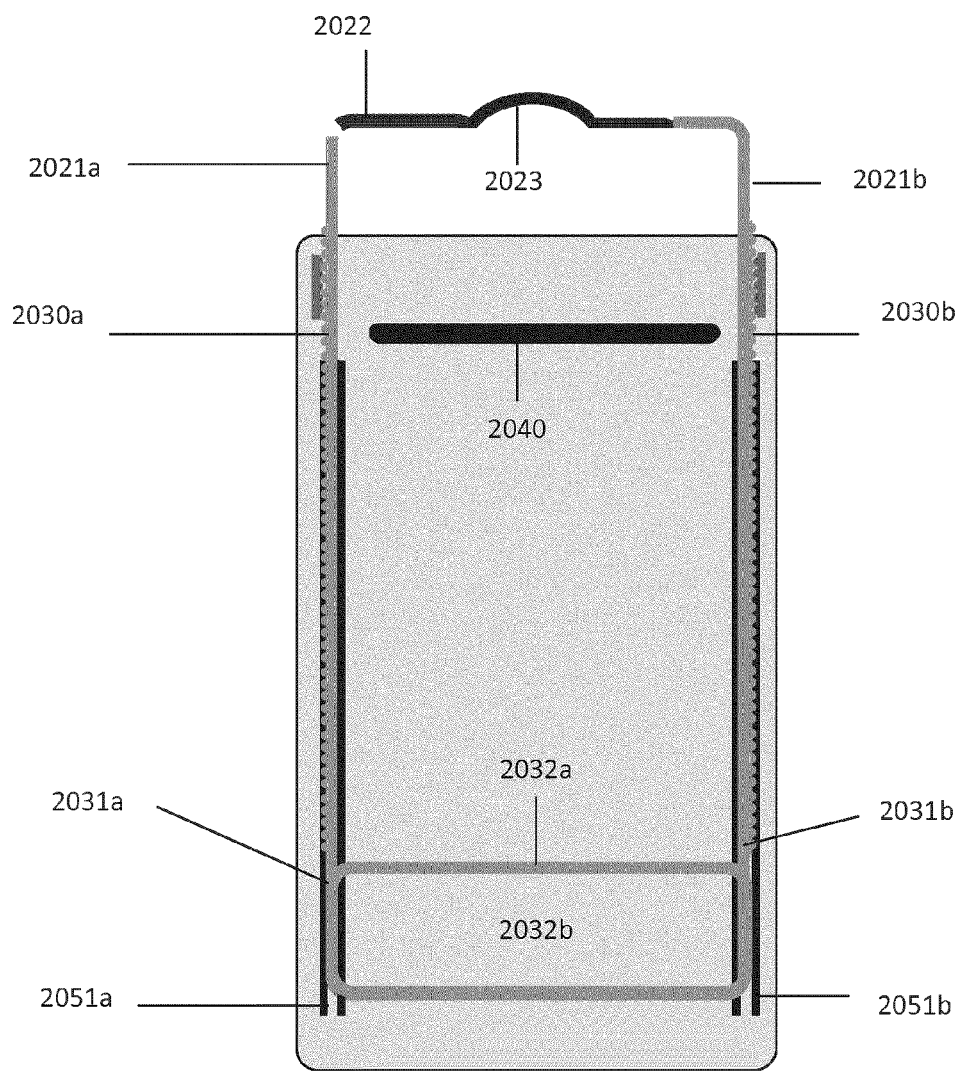
FIG. 23 is a cut-away of the MCD in a case with the mounting system partially stowed.
Figure 24A:
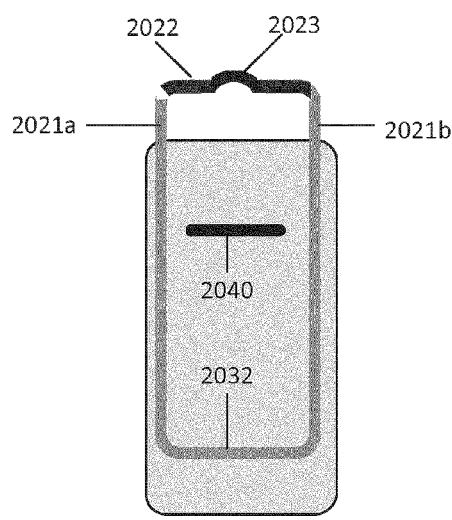
FIGS. 24A and 24B depict simplified device of FIG. 23 for illustration purposes.
Figure 24B:
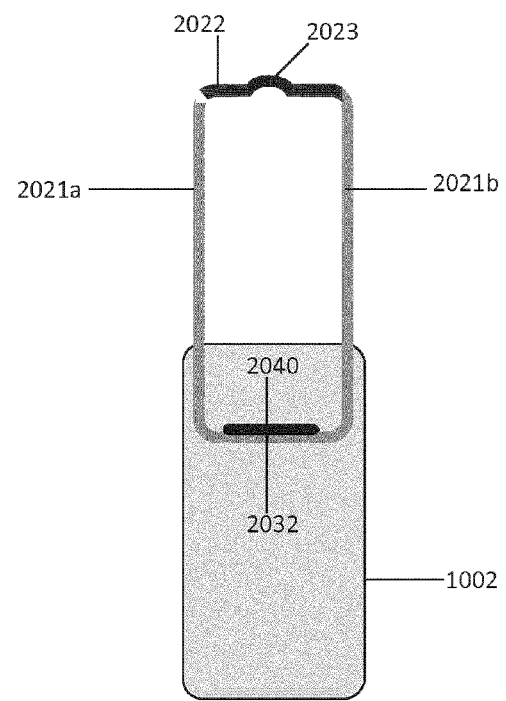

FIG. 23 shows an illustrative example of the structure of the mounting system 2001 by internal view of the case 1002. FIG. 24 shows a simplified view of the embodiment of FIG. 23. The mounting system 2001 frame 2020 can be pulled/retracted to approximately the size of the case 1002 providing flexibility in adjusting the MCD 206 to the user's needs including view height and positioning. To limit how much the frame 2020 can be extended from the case 1002—preventing from detaching itself from the case—a blocking module 2040 is attached at the top part as shown in FIG. 24B. In one embodiment, the blocking module 2040 is a flange or structure within the case 1002 substantially in the same plane as the frame 2020. The frame 2020, in the illustrated embodiments, includes a blocking horizontal arm 2032 that engages with the blocking module 2040 to limit the amount the frame 2020 can be extended from the case 1002. In one embodiment, the arm 2032 is a plurality of extending portions rather than a solid extending arm of FIG. 24A.

Figure 25A:
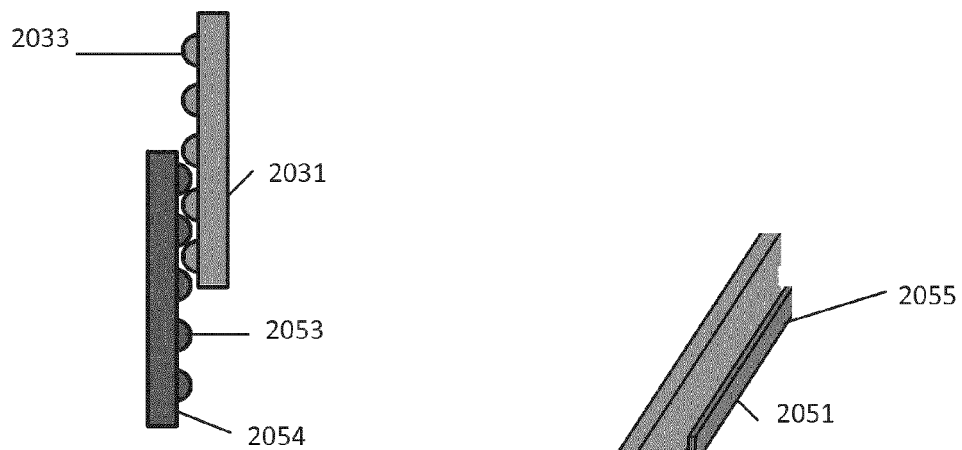
FIGS. 25A, 25B, and 25C illustrate a locking mechanism.

In a further embodiment, also show in FIG. 23, a locking mechanism 2050 is provided. The locking mechanism 2050 allows the frame 2020 to lock at various amounts of extension from the case 1002, such as via an interlocking system 2059 example is shown in FIG. 23 and FIG. 25A. In the illustrated embodiment, the interlocking system comprises a plurality of opposing teeth or protrusions 2053, 2033. In one embodiment, a rail 2051 is provided that is secured to the case 1002 or the MCD 206. The frame 2020 is slidable relative to the rail 2051. The rail 2051 may have one or more vertical rail elements 2051a, 2051b corresponding to the respective vertical supports 2021a, 2021b. Each vertical support 2021 engages and is slidable along a corresponding rail 2051 in the embodiment of FIG. 23. The interlocking system 2059 provides for engagement between the rail 2051 and the vertical support 2021. It should be appreciated that the vertical support 2021 can be shaped to provide varied resistance to address the different weights of MCDs 206. This includes, but is not limited to, shapes that are square, rectangular, triangular, round, etc. FIG. 25A shows a rounded implementation example.

Figure 25B:
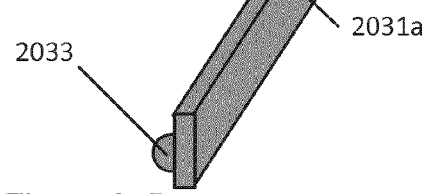
Figure 25C:
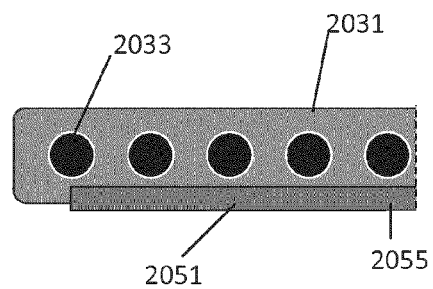

As discussed above, the vertical supports 2021 may engage with a vertical rail element 2051. The engagement may provide one or more of the locking mechanism 2050 function and securing the vertical supports 2021 to the case 1002 and/or MCD 206. An example implementation of a vertical rail element 2051 is shown in FIG. 25B with the corresponding portion of the interlocking mechanism 2050 being rounded teeth 2053 pointing towards the left hand side of the image and a track 2054. Another view of the vertical rail element 2051 is shown in FIG. 25C, where the teeth 2053 point away from the image page and the vertical rail element 2051 includes a retention flange that keeps the vertical support 2021a in place and aligned.

Figure 26A:
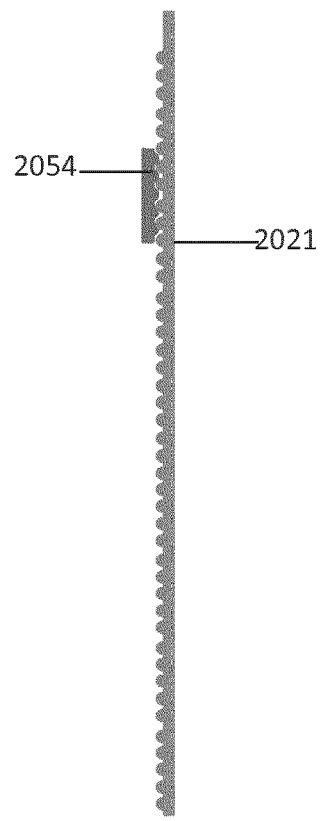
FIG. 26A shows a portion of the locking mechanism where the vertical support is straight and engaged with the lock rail.
Figure 26B:
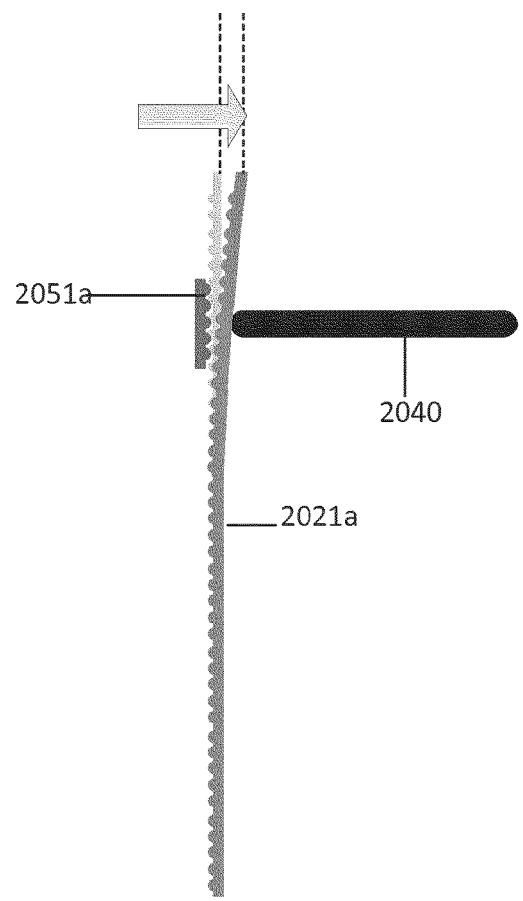
FIG. 26B shows the vertical support bent away from the lock rail allowing the vertical support to slide relative to the case, with the retention module engaging to limit the bending of the vertical support.

In one embodiment, the locking mechanism 2050 is biased to a locked state (FIG. 26A) and may be moved to a unlocked state (FIG. 26B) with enough force, the interlocking mechanism 2059 can be separated by pulling or pushing the dual handle system, as shown in FIGS. 26A and 26B.

That implementation illustrates an embodiment where the vertical handle supports 2021 are bendable or flexible away from the vertical rail element 2051. Specifically, one or more of the vertical supports 2021 are bendable away, such as towards the center of the mounting frame 2020 in plane of the frame 2020, to disengage the teeth 2033 from the teeth 2053 of the rail 2051. This allows the vertical support to slide along the rail 2051 free of the interlocking mechanism 2059 for intuitive user interaction design that allows for smooth pulling or pushing gestures. This can be accomplished by a squeezing action on the portion of the vertical supports 2021 extending beyond the case 1002. FIG. 26A shows the vertical support 2021a in rest and upright, unbent state where it is interlocked with the fixed interlocking pair 2033, 2053. In FIG. 26B, the vertical support 2021 is bent, such as by squeezing in conjunction with the opposite vertical support 2021b (not shown in FIG. 26B) causing a gap to occur between the vertical support 2021a and the rail 2051a, specifically disengaging the respective components 2033, 2053 of the interlocking mechanism 2059. This allows for smooth pulling/pushing until the force exerted by the user, such as the squeezing pressure, is released by the user. Once pressure is released, the interlocking mechanism snaps back (such as biased by the original configuration and elasticity of the material) the handle back securely into its rest in place. In FIG. 26B, amount of bending is optionally limited by a blocking module 2040, preventing overbending that may damage the vertical support 2021a.

Figure 27:
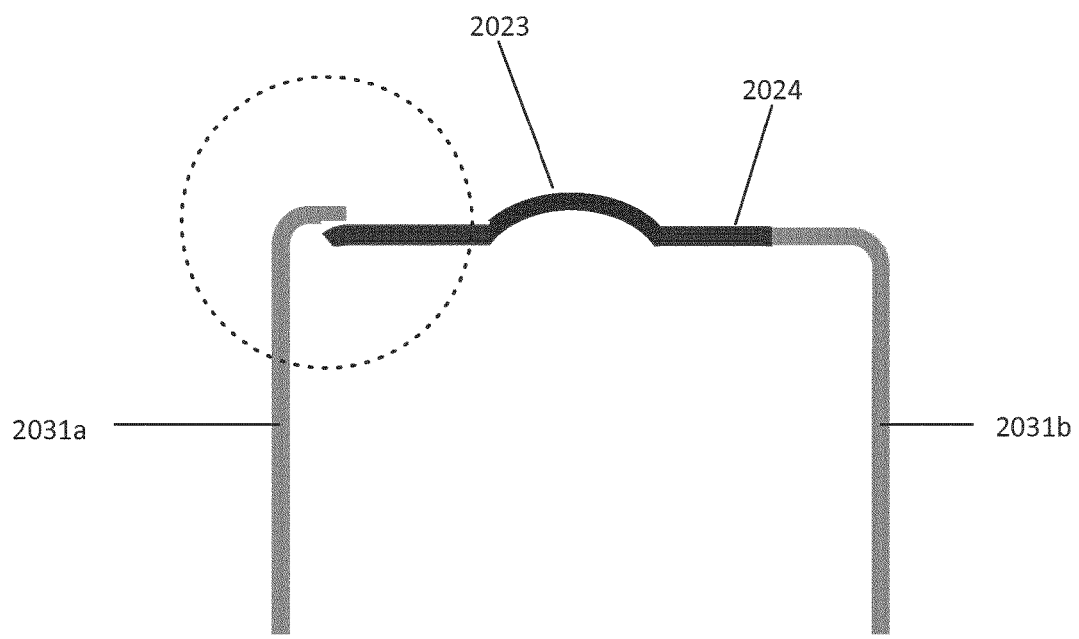
FIG. 27 shows another implementation of the top horizontal handle portion of mounting system 2001 where the horizontal handle resides below a flange portion of the vertical support.

FIG. 27 shows another implementation of the top horizontal handle pivoting portion 2024 of mounting system 2001. Here, one of the vertical supports 2021 includes a horizontal protrusion that engages with and slightly overlaps with the horizontal handle 2022. The horizontal handle 2022 can be in part or fully, more (or less or equally) flexible and bendable compared to the vertical supports 2021. This mechanism allows for additional safety in securing heavier MCDs 206 to the rearview mirror support as the clip will not as easily open, preventing unintended release of the MCD from the mirror. This mechanism does not impede on releasing the MCD 206 when pulling it with reasonable force, thus allowing for extra safety when hung on to the mirror 21, for example.

In another implementation the top handle is safely closed with a locking mechanism for added safety. This mechanism, however, requires additional manual release action of the horizontal locking mechanism.

In another implementation, the dual mounting system 2001 is rendered via filaments, including elastic filaments, as in the string model whereby it can be pulled out from the MCD case at one of the corner top positions and secured around the rearview mirror support and clipped on the other side of the top of the MCD case. Once finished, the clipped end can be unclipped and retracted back to the case.

Figure 28C:
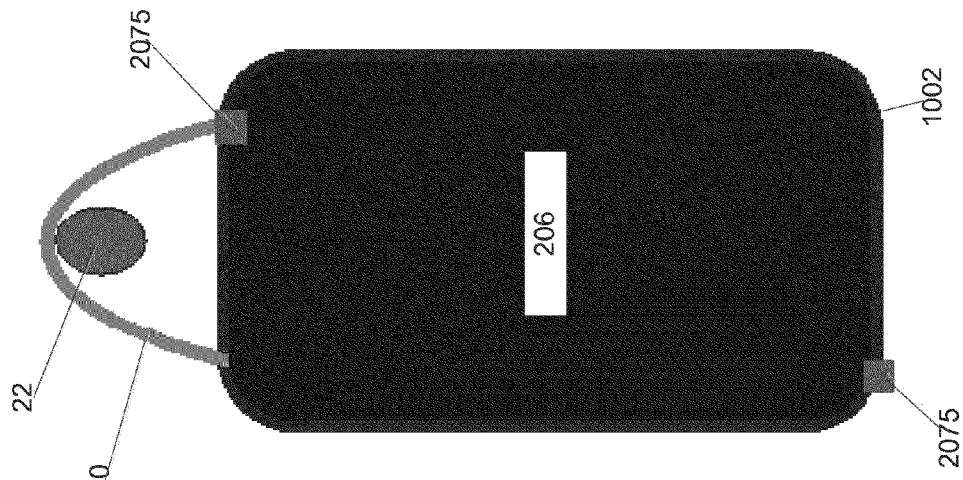
FIGS. 28A, 28B, and 28C illustrate an embodiment having a filament as the mounting system 2001
Figure 28B:
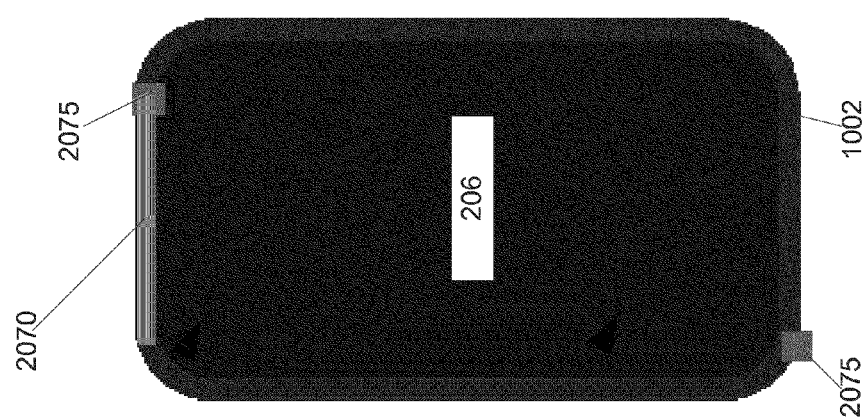
Figure 28A:
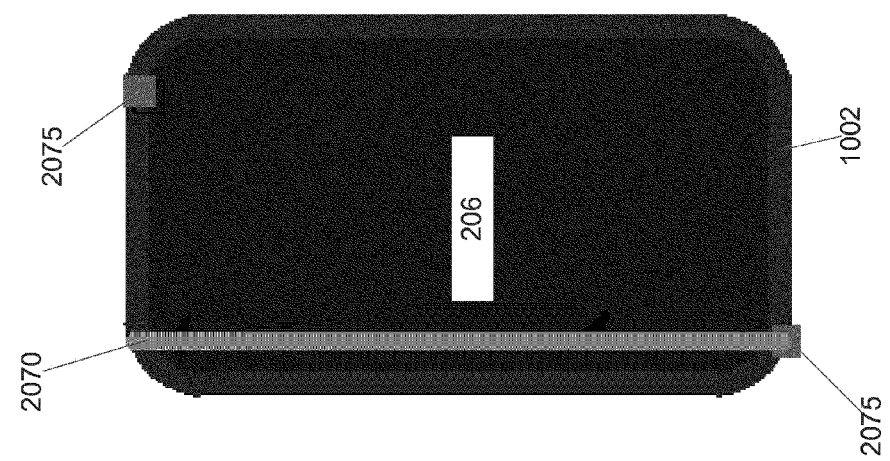

In another implementation, the mounting system 2001 is rendered via single or multiple filaments 2070, including elastic filament types. Thus, in one embodiment shown in FIGS. 28A-C, a filament 2070 is provided attached to the case 1002. The filament 2070 is detachable at one end so as to allow the filament 2070 to loop over a support 22 and is then reattachable to the case at a reattachment point 2075. The reattachment point 2075 may be the same or different as the location the filament is secured to the case 1002 when stowed. FIG. 28A shows a filament 2070 aligned vertically for landscape mounting of the MCD 206. FIG. 28B shows a filament 2070 aligned horizontally for portrait mounting of the MCD 206. The filament 2070 may be elastic or inelastic. In one embodiment, the filament 2070 comprises a high-friction surface for aiding in securing the MCD 206 to the support 22. This implementation bypasses the need for a separate retracting mechanism.

In another implementation visuals on the touchscreen/monitor of the MCD is variably transparent allowing the user to see through the MCD. In this implementation the "wallpaper" background of the OS is not a static picture but real-time video captured by the MCDs camera. This design creates a quasi-cloaking feature, which can further add to safety when driving. For example, when using the MCD as a navigation system with a mobile mapping software such as Google Maps, the map itself can be rendered semitransparent allowing map information and real-time road activity information.

In another implementation, mounting system 2001 is a standalone add-on for existing cases. In these instances mounting system 2001 can be attached to conventional cases with permanent or semi-permanent adhesives or other means of securing it to existing MCD cases.

In another implementation, mounting system 2001 includes a positionable frame 2020, such that the vertical supports 2021 can be bent to retain a desired shape such as bent to form an angled frame for to customize the fit when mounted to a support 22.

In another implementation mounting system 2001 can engage with a MCD 206 and/or a case 1002 in a "landscape" orientation. In one embodiment, the vertical supports 2021 are flexible and elastic, allowing the supports to curve within the landscape orientated case 1002 such that the vertical support 2021 may be longer than the height of the landscape oriented case 1002.

In another implementation mounting system 2001 the vertical support 2021 is implemented via telescoping technologies, such as akin to travel luggage systems, where the frame can be can be pulled and retracted through the telescoping mechanisms.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Moreover, the separation of various system components in the implementations described above should not be understood as requiring such separation in all implementations, and it should be understood that the described program components and systems can generally be integrated in a single software product or packaged into multiple software products.

Similarly, while operations are depicted in the drawings in a particular order, this should not be understood as requiring that such operations be performed in the particular order shown or in sequential order, or that all illustrated operations be performed, to achieve desirable results. Thus, particular implementations of the subject matter have been described. Other implementations are within the scope of the following claims.

What is claimed is:

1. A system comprising:
an accelerometer configured to provide angle information of a device; and
one or more processors configured to:
   receive a reference position;
   continuously measure a current position based upon the angle information of the device; and
   determine a current pressure based upon the current position and the reference position,
a first layer of resistive material comprising two or more removable sections attach to the device configured to compress when the device is pressed; and
a second layer of resistive material attached to the first layer of resistive material configured to compress when the device is pressed,
wherein the one or more processors are further configured to measure a calibration position based upon the angle information of the device when the device is at rest with no pressure applied, wherein the calibration position is the reference position, and the accelerometer is used to measure an amount of tilt with respect to the calibration position of the device at rest, and tilt is dependent upon the pressure and movement of the first resistive material layer and the second resistive material layer.

2. The system of claim 1, wherein the one of more processors are further configured to augment an audio signal based upon the current pressure.

3. The system of claim 2, wherein the system further comprises a speaker configured to output the augmented audio signal.

4. The system of claim 2, wherein tremolo of the audio signal is augmented based upon the current pressure.

5. The system of claim 2, wherein vibrato of the audio signal is augmented based upon the current pressure.

6. The system of claim 2, wherein velocity of the audio signal is augmented based upon the current pressure.

7. The system of claim 1, wherein the one or more processors are further configured to:
   augment an audio instruction; and
   send the augmented audio instruction to a remote device.

8. The system of claim 1, wherein the calibration position is a first calibration position and wherein the one or more processors are further configured to measure a second calibration position, the second calibration position includes capturing maximum displacement of the tablet, and wherein the first calibration position and the second calibration position correspond to a maximum accelerometer range.

9. A method comprising:
receiving, from an accelerometer, angle information of a device;
measuring a calibration position based upon the angle information of the device when the device is at rest with no pressure applied;
continuously measuring a current position based upon the angle information of the device, wherein the accelerometer is used to measure an amount of tilt with respect to the calibration position, and wherein tilt is dependent upon the pressure and movement of a first resistive material layer and a second resistive material layer, wherein the first layer of resistive material comprising two or more removable sections attach to the device configured to compress when the device is pressed, and wherein the second layer of resistive material attached to the first layer of resistive material configured to compress when the device is pressed; and
determining a current pressure based upon the current position and the calibration position.

10. The method of claim 9, further comprising augmenting an audio signal based upon the current pressure.

11. The method of claim 10, further comprising outputting the augmented audio signal.

12. The method of claim 10, wherein tremolo of the audio signal is augmented based upon the current pressure.

13. The method of claim 10, wherein vibrato of the audio signal is augmented based upon the current pressure.

14. The method of claim 10, wherein velocity of the audio signal is augmented based upon the current pressure.

15. The method of claim 10, further comprising:
augmenting an audio instruction; and
sending the augmented audio instruction to a remote device.

16. A non-transitory computer-readable memory having instructions stored thereon, the instructions comprising:
   instructions for receiving, from an accelerometer, angle information of a device;
   instructions for measuring a calibration position based upon the angle information of the device when the device is at rest with no pressure applied;
   instructions for continuously measuring a current position based upon the angle information of the device, wherein the accelerometer is used to measure an amount of tilt with respect to the calibration position, and wherein tilt is dependent upon the pressure and movement of a first resistive material layer and a second resistive material layer, wherein the first layer of resistive material comprising two or more removable sections attach to the device configured to compress when the device is pressed, and wherein the second layer of resistive material attached to the first layer of resistive material configured to compress when the device is pressed; and
   instructions for determining a current pressure based upon the current position and the calibration position.

17. The non-transitory computer-readable memory of claim 16, wherein the instructions further comprising instructions for augmenting an audio signal based upon the current pressure.

18. The non-transitory computer-readable memory of claim 17, wherein the instructions further comprising instructions for outputting the augmented audio signal.

19. The non-transitory computer-readable memory of claim 17, wherein tremolo of the audio signal is augmented based upon the current pressure.

* * * * *